United States Patent
Kilian et al.

(10) Patent No.: US 11,683,677 B2
(45) Date of Patent: Jun. 20, 2023

(54) EFFICIENT AND DYNAMIC ADDRESSING METHODS TO A PLURALITY OF RECEIVERS

(71) Applicant: Fraunhofer-Gesellschaft zur Förderung der angewandten Forschung e.V., Munich (DE)

(72) Inventors: Gerd Kilian, Erlangen (DE); Josef Bernhard, Erlangen (DE); Michael Schlicht, Erlangen (DE); Jakob Kneißl, Erlangen (DE); Frank Nachtrab, Erlangen (DE); Johannes Wechsler, Erlangen (DE); Dominik Soller, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/558,534

(22) Filed: Sep. 3, 2019

(65) Prior Publication Data

US 2019/0394636 A1    Dec. 26, 2019

Related U.S. Application Data

(63) Continuation of application No. PCT/EP2018/056192, filed on Mar. 13, 2018.

(30) Foreign Application Priority Data

Mar. 14, 2017    (DE) .................. 10 2017 204 186.2

(51) Int. Cl.
*H04W 8/26* (2009.01)
*H04B 1/7143* (2011.01)
(Continued)

(52) U.S. Cl.
CPC ............ *H04W 8/26* (2013.01); *H04B 1/7143* (2013.01); *H04W 40/244* (2013.01); *H04W 84/18* (2013.01)

(58) Field of Classification Search
CPC ..... H04W 4/08; H04W 40/244; H04W 8/265; H04W 8/26; H04W 72/121; H04W 84/18;
(Continued)

(56) References Cited

U.S. PATENT DOCUMENTS

| 10,321,493 B2 | 6/2019 | Li et al. | |
| 2003/0140298 A1* | 7/2003 | Koprivica | H04L 29/06 |
| | | | 714/758 |

(Continued)

FOREIGN PATENT DOCUMENTS

| EP | 2 357 773 A2 | 8/2011 |
| EP | 2914039 A1 | 9/2015 |

(Continued)

OTHER PUBLICATIONS

Japanese Office Action dated Oct. 27, 2020, issued in application No. 2019-550717.

(Continued)

*Primary Examiner* — Ian N Moore
*Assistant Examiner* — Sun Jong Kim
(74) *Attorney, Agent, or Firm* — McClure, Qualey & Rodack, LLP

(57) ABSTRACT

A transmitter is configured to communicate with a multiplicity of receivers, and is configured to transmit first data, the first data including a non-unique addressing information addressing a subset of the multiplicity of receivers, the subset including at least two receivers, the transmitter further being configured to transmit second data, the second data including a further addressing information or transmitted according to a further addressing information, the (Continued)

addressing information addressing one receiver (or one group of receivers) of the subset of the multiplicity of receivers.

30 Claims, 18 Drawing Sheets

(51) Int. Cl.
*H04W 40/24* (2009.01)
*H04W 84/18* (2009.01)

(58) Field of Classification Search
CPC .... H04W 4/06; H04W 4/021; H04L 61/2069; H04L 61/20; H04L 61/608; H04L 61/00; H04L 61/6072; H04L 29/12292; H04B 1/7143
See application file for complete search history.

(56) References Cited

U.S. PATENT DOCUMENTS

| | | | |
|---|---|---|---|
| 2003/0149824 A1 | 8/2003 | Smith et al. | |
| 2005/0025080 A1 | 2/2005 | Liu | |
| 2005/0049012 A1* | 3/2005 | Chang | H04W 52/0216 455/574 |
| 2005/0070331 A1* | 3/2005 | Higuchi | H01Q 3/30 455/562.1 |
| 2005/0182884 A1* | 8/2005 | Hofmann | G06F 13/4243 710/305 |
| 2006/0140187 A1 | 6/2006 | Fujinami | |
| 2007/0263702 A1* | 11/2007 | Kwon | H04L 5/0082 375/135 |
| 2011/0141892 A1* | 6/2011 | Gong | H04W 4/08 370/235 |
| 2011/0019447 A1 | 8/2011 | Kim et al. | |
| 2014/0003343 A1* | 1/2014 | Kwon | H04L 61/6072 370/328 |
| 2015/0334555 A1* | 11/2015 | Seo | H04W 8/186 370/254 |
| 2017/0006092 A1* | 1/2017 | Rochwerger | H04L 67/1023 |
| 2017/0034124 A1* | 2/2017 | Toda | H04L 12/1886 |
| 2018/0007699 A1 | 1/2018 | Ishii | |
| 2018/0219703 A1* | 8/2018 | Shen | H04B 7/0456 |

FOREIGN PATENT DOCUMENTS

| | | |
|---|---|---|
| JP | 2006-186560 A | 7/2006 |
| JP | 2011-066911 A | 3/2011 |
| JP | 2013115677 A | 6/2013 |
| WO | 2016015573 A1 | 2/2016 |
| WO | 2016129074 A1 | 11/2017 |

OTHER PUBLICATIONS

English language translation of Japanese Office Action dated Oct. 27, 2020, issued in application No. 2019-550717.
Korean Office Action dated Jul. 21, 2020, issued in application No. 10-2019-7028559.
English language translation of Korean Office Action dated Jul. 21, 2020, issued in application No. 10-2019-7028559.
International Search Report dated Jun. 22, 2018, issued in application No. PCT/EP2018/056192.
International Examination Procedure dated Jun. 24, 2019, issued in application No. PCT/EP2018/056192.
"Draft Revision for Standard for Information technology? Telecommunications and information exchange between systems? Local and metropolitan area networks? Specific requirements? Part 15.4b: Wireless Medium Access Control (MAC) and Physical Layer (PHY) Specifications for Low Rate Wireless Personal Ar" IEEE Draft; P802.15.4REVB-D2, IEEE-SA, Piscataway, NJ USA, vol. 802.15. 4b, Jun. 30, 2005 pp. 1-287.
European Office Action dated Feb. 18, 2021, issued in application No. 18711877.3.
Chinese language office action dated Sep. 23, 2021, issued in application No. CN 201880031786.X.
English language translation of office action dated Sep. 23, 2021, issued in application No. CN 201880031786.X.
Japanese language Notice of Allowance dated Oct. 12, 2021, issued in application No. JP JP2019-550717.

* cited by examiner

110_8 — SN company C act: 10, pen: 0.1 bin 0 assignment costs:
$10 \cdot 0.1 +$
$(10 \cdot 0 + 10 \cdot 0) \cdot XC +$
$(10 \cdot 0.1 + 10 \cdot 0.1) \cdot XC$
$= 5$ bin 1 assignment costs:
$10 \cdot 0.1 +$
$(10 \cdot 1 + 10 \cdot 2) \cdot XC +$
$(1 \cdot 0.1 + 2 \cdot 0.1) \cdot XC$
$= 61.6$ bin 2 assignment costs:
$10 \cdot 0.1 +$
$10 \cdot 1.5 +$
$6 \cdot 0.1$
$= 16.6$ self induced costs of the new SN +
effect of new SN on present SN +
effect of present SN on new SN
= total costs of assignment

220

```
┌─────────────────────────────────────┐
│ Associating each receiver of a       │
│ multiplicity of receivers with one   │
│ or multiple parameters quantifying   │──222
│ how the presence of said receiver    │
│ affects other receivers in the same  │
│ subset                               │
└─────────────────────────────────────┘
                   │
                   ▼
┌─────────────────────────────────────┐
│ Associating each receiver of the     │
│ multiplicity of receivers with one   │
│ or multiple parameters weighting     │──224
│ the severity of the effects caused   │
│ by other receivers in the same       │
│ subset                               │
└─────────────────────────────────────┘
                   │
                   ▼
┌─────────────────────────────────────┐
│ Optimizing the overall weighted      │
│ effects towards a minimum total of   │
│ weighted effects or optimizing       │
│ towards a minimum of the variance    │
│ of the weighted effects between      │──226
│ different subsets, or a combination  │
│ thereof via the penalization of      │
│ deviations in the variance towards   │
│ the total weighted effects           │
└─────────────────────────────────────┘
```

Fig. 24

EFFICIENT AND DYNAMIC ADDRESSING METHODS TO A PLURALITY OF RECEIVERS

CROSS-REFERENCES TO RELATED APPLICATIONS

This application is a continuation of copending International Application No. PCT/EP2018/056192, filed Mar. 13, 2018, which is incorporated herein by reference in its entirety, and additionally claims priority from German Application No. DE 102017204186.2, filed Mar. 14, 2017, which is incorporated herein by reference in its entirety.

Embodiments relate to a transmitter for communicating with a multiplicity of receivers, and specifically, to a transmitter that efficiently addresses one receiver or a group of receivers of the multiplicity of receivers. Further embodiments relate to a receiver, and specifically, to a receiver that is efficiently addressable. Some embodiments relate to an apparatuses and methods for efficient multi user addressing.

BACKGROUND OF THE INVENTION

In low-power wide area networks (LPWAN) one base station (BS) typically communicates with multiple, potentially millions, of sensor nodes (SN). SN are often battery powered or use energy harvesting techniques to gain independency from the power grid.

FIG. 1 shows a schematic diagram of a typical LPWAN setup with one base station 10 and multiple sensor nodes 11. The transmissions from sensor node 11 to base station 10 are considered as uplink, transmissions from base station 10 to sensor node 11 are considered as downlink. Realization of a downlink communication involves that the sensor node 11 listen for incoming transmissions. Due to power consumption constraints a sensor node 11 usually cannot continuously receive data but can only wake up briefly during defined downlink transmission timeslots. In synchronous LPWAN setups the base station 10 therefore sends a broadcast telegram or beacon at specified intervals to establish and harmonize a transmission slot scheme across the network. Sensor node 11 can extract the position of consecutive beacons from the received beacon data, the initial beacon position needs to be acquired by search or via an asynchronous attachment procedure.

After synchronization, the sensor node 11 wakes up just before the next beacon is expected. Sensor node 11 can also skip beacons and receive only every second, third, etc. beacon to trade increased maximum delay for lower power consumption. The base station 10 will be aware of the beacon reception schedule of the sensor node. The beacon will be kept as short as possible with an interval of several seconds or even minutes between the beacons to minimize the power consumption at the sensor node for the regular beacon receptions and to reduce the duty cycle of the base station. Accordingly, the beacon itself cannot be used to transmit regular downlink payload data for specific sensor node. Instead, the payload data transmission is conducted in timeslots between the beacons. Some highly critical downlink payload data might also be included in the beacon itself.

Two known options are available for the transmission initiation and scheduling. Fixed listening and full addressing.

In the fixed listening mode, the beacon is merely used as a positioning marker to harmonize the transmission slot schedule. No addressing information is included in the beacon. Every sensor node 11 is listening at fixed transmission slots or predefined transmission slot permutations. For example, one sensor node 11 might listens at the first slot after every second beacon or an alternation between a set of transmission slots after consecutive beacons might be used. Different sensor nodes 11 might also listen for different frequencies or hopping patterns. This mode provides a simple option for scenarios where higher delays are acceptable or the power budget allows more frequent listening to achieve shorter delays. Listening timeslots can either be assigned by the base station 10 or chosen by the sensor node 11 but have to be known at the base station 10 in any case.

Thereby, sensor nodes 11 listening time is reduced to certain timeslots. The base station 10 is aware of the listening timeslots of every sensor node 11 and can therefore initiate downlink transmissions accordingly. Timeslot pattern is aligned via a recurring beacon transmission.

The full addressing mode includes the address of one or multiple sensor nodes 11 with pending downlink transmissions in the beacon. Assignment of a time slot can also be provided explicitly or can be derived from other beacon data or can be fixed for the addressed sensor node. This mode involves that only specifically addressed sensor nodes 11 wake up for downlink transmissions thus easing the tradeoff between delay and power consumption. However, in larger networks a short beacon transmission cannot include the full addressing information for several nodes. Therefore, the full addressing mode is more suitable for scenarios with sparse transmissions or a lower number of sensor nodes.

Thereby, the base station 10 uses the beacon to fully address one or multiple sensor node(s) 11. Only addressed sensor nodes 11 listen for downlink transmissions in an explicitly or implicitly assigned transmission slot. Addressing and data transmission are separated in the time domain.

SUMMARY

One embodiment may have a transmitter configured to communicate with a multiplicity of receivers, wherein the transmitter is configured to transmit a beacon, the beacon including a non-unique addressing information addressing a subset of the multiplicity of receivers, the subset including at least two receivers, wherein the transmitter is configured to transmit a data packet, wherein the data packet includes a further addressing information or wherein the data packet is transmitted according to a further addressing information, the further addressing information addressing one receiver or one group of receivers of the subset of the multiplicity of receivers; wherein a number of receivers of the subset of receivers is smaller than a number of receivers of the multiplicity of receivers; wherein the beacon and the data packet are transmitted in different time slots; wherein the further addressing information according to which the data packet is transmitted is at least one out of a transmission time of the data packet, a transmission frequency of the data packet, a time slot in which the data packet is transmitted, a frequency band in which the data packet is transmitted, a frequency hopping pattern according to which the data packet is transmitted, a time hopping pattern according to which the data packet is transmitted and a time-frequency hopping pattern according to which the data packet is transmitted.

Another embodiment may have a receiver having a non-unique address for communicating with a transmitter, wherein the receiver is configured to receive a beacon including a non-unique addressing information and to determine whether he is addressed by the non-unique addressing information, wherein the receiver is configured to determine whether a data packet includes an expected further addressing information or is transmitted according to a further addressing information if he is addressed by the non-unique addressing information, and to receive and process the data packet if the data packet includes the expected further addressing information or is transmitted according to the expected further addressing information; wherein the beacon and the data packet are received in different time slots; wherein the further addressing information according to which the data packet is received is at least one out of a transmission time of the data packet, a transmission frequency of the data packet, a time slot in which the data packet is transmitted, a frequency band in which the data packet is transmitted, a frequency hopping pattern according to which the data packet is transmitted, a time hopping pattern according to which the data packet is transmitted and a time-frequency hopping pattern according to which the data packet is transmitted.

According to another embodiment, a system may have: an inventive transmitter; and an inventive receiver.

According to another embodiment, a method may have the steps of: Transmitting a beacon, the beacon including a non-unique addressing information addressing a subset of a multiplicity of receivers, the subset including at least two receivers; and Transmitting a data packet, wherein the data packet includes a further addressing information or wherein the data packet is transmitted according to a further addressing information, the further addressing information addressing one receiver of the subset of the multiplicity of receivers; wherein a number of receivers of the subset of receivers is smaller than a number of receivers of the multiplicity of receivers; wherein the beacon and the data packet are transmitted in different time slots; wherein the further addressing information according to which the data packet is transmitted is at least one out of a transmission time of the data packet, a transmission frequency of the data packet, a time slot in which the data packet is transmitted, a frequency band in which the data packet is transmitted, a frequency hopping pattern according to which the data packet is transmitted, a time hopping pattern according to which the data packet is transmitted and a time-frequency hopping pattern according to which the data packet is transmitted.

According to another embodiment, a method may have the steps of: receiving a beacon including a non-unique addressing information; determining whether a receiver is addressed by the non-unique addressing information; determining whether a data packet includes an expected further addressing information or is transmitted according to an expected further addressing information, if the receiver is addressed by the non-unique addressing information; and receiving and processing the data packet if the data packet includes the expected further addressing information or is transmitted according to the expected further addressing information; wherein the beacon and the data packet are received in different time slots; wherein the further addressing information according to which the data packet is received is at least one out of a transmission time of the data packet, a transmission frequency of the data packet, a time slot in which the data packet is transmitted, a frequency band in which the data packet is transmitted, a frequency hopping pattern according to which the data packet is transmitted, a time hopping pattern according to which the data packet is transmitted and a time-frequency hopping pattern according to which the data packet is transmitted.

Another embodiment may have a method for forming a subset of receivers which share the same non-unique addressing information: Associating each receiver of a multiplicity of receivers with one or multiple parameters quantifying how the presence of said receiver affects other receivers in the same subset; Associating each receiver of the multiplicity of receivers with one or multiple parameters weighting the severity of the effects caused by other receivers in the same subset; and Optimizing the overall weighted effects towards a minimum total of weighted effects or optimizing towards a minimum of the variance of the weighted effects between different subsets, or a combination thereof via the penalization of deviations in the variance towards the total weighted effects; wherein a number of receivers of the subset of receivers is smaller than a number of receivers of the multiplicity of receivers.

According to another embodiment, a non-transitory digital storage medium may have a computer program stored thereon to perform the inventive methods, when said computer program is run by a computer.

Another embodiment may have a transmitter, configured to communicate with a multiplicity of receivers, wherein the transmitter is configured to transmit first data, the first data including a non-unique addressing information addressing a subset of the multiplicity of receivers, the subset including at least two receivers, wherein the transmitter is configured to transmit second data including a further addressing information or transmitted according to a further addressing information, the further addressing information addressing one receiver or one group of receivers of the subset of the multiplicity of receivers; wherein the transmission of the first data and the transmission of the second data are separate and/or independent transmissions; wherein a number of receivers of the subset of receivers is smaller than a number of receivers of the multiplicity of receivers; wherein the first data and the second data are transmitted in different time slots; wherein the further addressing information according to which the second data is transmitted is at least one out of a transmission time of the data packet, a transmission frequency of the data packet, a time slot in which the data packet is transmitted, a frequency band in which the data packet is transmitted, a frequency hopping pattern according to which the data packet is transmitted, a time hopping pattern according to which the data packet is transmitted and a time-frequency hopping pattern according to which the data packet is transmitted.

According to another embodiment, a method may have the steps of: Transmitting first data, the first data including a non-unique addressing information addressing a subset of a multiplicity of receivers, the subset including at least two receivers; and Transmitting second data including a further addressing information or transmitted according to a further addressing information, the further addressing information addressing one receiver of the subset of the multiplicity of receivers; wherein the transmission of the first data and the transmission of the second data are separate and/or independent data transmissions; wherein a number of receivers of the subset of receivers is smaller than a number of receivers of the multiplicity of receivers; wherein the first data and the second data are transmitted in different time slots; wherein the further addressing information according to which the second data is transmitted is at least one out of a transmission time of the data packet, a transmission frequency of the data packet, a time slot in which the data packet is transmitted, a frequency band in which the data packet is transmitted, a frequency hopping pattern according to which the data packet is transmitted, a time hopping pattern according to which the data packet is transmitted and a time-frequency hopping pattern according to which the data packet is transmitted.

Another embodiment may have a receiver having a non-unique address for communicating with a transmitter, wherein the receiver is configured to receive first data including a non-unique addressing information and to determine whether he is addressed by the non-unique addressing information, wherein the receiver is configured to determine whether second data includes an expected further addressing information or is transmitted according to an expected further addressing information if he is addressed by the non-unique addressing information, and to receive and process the second data if the second data includes the expected further addressing information or is transmitted according to the expected further addressing information; wherein the reception of the first data and the reception of the second data are separate and/or independent receptions; wherein the first data and the second data are received in different time slots; wherein the further addressing information according to which the second data is received is at least one out of a transmission time of the data packet, a transmission frequency of the data packet, a time slot in which the data packet is transmitted, a frequency band in which the data packet is transmitted, a frequency hopping pattern according to which the data packet is transmitted, a time hopping pattern according to which the data packet is transmitted and a time-frequency hopping pattern according to which the data packet is transmitted.

According to another embodiment, a method may have the steps of: receiving first data including a non-unique addressing information; determining whether a receiver is addressed by the non-unique addressing information; determining whether second data includes an expected further addressing information or is transmitted according to an expected further addressing information, if the receiver is addressed by the non-unique addressing information; and receiving and processing the second data if the second data includes the expected further addressing information or is transmitted according to the expected further addressing information; wherein the reception of the first data and the reception of the second data are separate and/or independent receptions; wherein the first data and the second data are received in different time slots; wherein the further addressing information according to which the second data is received is at least one out of a transmission time of the data packet, a transmission frequency of the data packet, a time slot in which the data packet is transmitted, a frequency band in which the data packet is transmitted, a frequency hopping pattern according to which the data packet is transmitted, a time hopping pattern according to which the data packet is transmitted and a time-frequency hopping pattern according to which the data packet is transmitted.

Another embodiment may have a transmitter, configured to communicate with a multiplicity of receivers, wherein the transmitter is configured to transmit a beacon, the beacon including a partial addressing information addressing a subset of the multiplicity of receivers, the subset including at least two receivers, wherein the transmitter is configured to transmit a data packet, wherein the data packet includes a full addressing information or wherein the data packet is transmitted according to the full addressing information, the full addressing information addressing one receiver or one group of receivers of the subset of the multiplicity of receivers; wherein a number of receivers of the subset of receivers is smaller than a number of receivers of the multiplicity of receivers; wherein the beacon and the data packet are transmitted in different time slots; wherein the further addressing information according to which the data packet is transmitted is at least one out of a transmission time of the data packet, a transmission frequency of the data packet, a time slot in which the data packet is transmitted, a frequency band in which the data packet is transmitted, a frequency hopping pattern according to which the data packet is transmitted, a time hopping pattern according to which the data packet is transmitted and a time-frequency hopping pattern according to which the data packet is transmitted.

Another embodiment may have a receiver having a non-unique address for communicating with a transmitter, wherein the receiver is configured to receive a beacon including a partial addressing information and to determine whether he is addressed by the partial addressing information, wherein the receiver is configured to determine whether a data packet includes an expected full addressing information or is transmitted according to the full addressing information if he is addressed by the partial addressing information, and to receive and process the data packet if the data packet includes the expected full addressing information or is transmitted according to the expected full addressing information; wherein the beacon and the data packet are received in different time slots; wherein the further addressing information according to which the data packet is received is at least one out of a transmission time of the data packet, a transmission frequency of the data packet, a time slot in which the data packet is transmitted, a frequency band in which the data packet is transmitted, a frequency hopping pattern according to which the data packet is transmitted, a time hopping pattern according to which the data packet is transmitted and a time-frequency hopping pattern according to which the data packet is transmitted.

Embodiments provide a transmitter configured to communicate with a multiplicity of receivers, wherein the transmitter is configured to transmit first data, the first data comprising a non-unique addressing information addressing a subset of the multiplicity of receivers, the subset comprising at least two receivers, wherein the transmitter is configured to transmit second data, the second data comprising a further addressing information or transmitted according to a further addressing information, the addressing information addressing one receiver (or one group of receivers) of the subset of the multiplicity of receivers.

Embodiments provide a receiver having a non-unique address for communicating with a transmitter, wherein the receiver is configured to receive first data comprising a non-unique addressing information and to determine whether he is addressed by the non-unique addressing information, wherein the receiver is configured to determine whether second data comprises an expected further addressing information or is transmitted according to the further addressing information if he is addressed by the non-unique addressing information, and to receive and process the second data if the second data comprises the expected further addressing information or is transmitted according to the expected further addressing information.

According to the concept of the present invention, instead of using a normal unique addressing information, a two-stage addressing scheme is used, wherein in first stage a non-unique addressing information (e.g., a short address) is used to non-uniquely address a subset of a multiplicity of receivers of a communication system, wherein in the second stage data is transmitted to the subset of receivers addressed in the first stage, the data comprising a second addressing information (e.g., a unique synchronization pattern) or being transmitted according to a second addressing information (e.g., a defined time slot, frequency band, or time/frequency hopping pattern), the second addressing information addressing one receiver (or optionally a group of receivers) of the subset of receivers addressed in the first stage.

Further embodiments provide a method for transmitting data. The method comprises a step of transmitting first data, the first data comprising a non-unique addressing information addressing a subset of a multiplicity of receivers, the subset comprising at least two receivers. Further, the method comprises a step of transmitting second data comprising a further addressing information addressing one receiver of the subset of the multiplicity of receivers.

Further embodiments provide a method for receiving data. The method comprises a step of receiving first data comprising a non-unique addressing information. Further, the method comprises a step of determining whether a receiver is addressed by the non-unique addressing information. Further, the method comprises a step of determining whether second data comprises an expected further addressing information or is transmitted according to the further addressing information, if the receiver is addressed by the non-unique addressing information. Further, the method comprises a step of receiving and processing the second data if the second data comprises the expected further addressing information or is transmitted according to the expected further addressing information.

Further embodiments provide a method for forming a subset of receivers which share the same non-unique addressing information. The method comprises a step of associating each receiver of a multiplicity of receivers with one or multiple parameters quantifying how the presence of said receiver affects other receivers in the same subset (e.g., an expected number of transmissions transmitted to the receiver). Further, the method comprises a step of associating each receiver of the multiplicity of receivers with one or multiple parameters weighting the severity of the effects caused by other receivers in the same subset (e.g., a tolerated power consumption). Further, the method comprises a step of optimizing the overall weighted effects towards a minimum total of weighted effects or optimizing towards a minimum of the variance of the weighted effects between different subsets, or a combination thereof via the penalization of deviations in the variance towards the total weighted effects.

Subsequently, advantageous implementations are described.

In embodiments, the non-unique addressing information and the further addressing information together uniquely address the one receiver out of the multiplicity of receivers.

In embodiments, the further addressing information uniquely addresses the one receiver out of the subset of the multiplicity of receivers.

In embodiments, the further addressing information non-uniquely addresses the one receiver out of the multiplicity of receivers.

In embodiments, the non-unique addressing information can be a short address shorter than a unique address uniquely identifying each of the multiplicity of receivers.

For example, the non-unique addressing information can be a hashed version of a unique address uniquely identifying each of the multiplicity of receivers.

For example, the further addressing information is at least one out of a data field in a data packet by means of which the second data is transmitted, a transmission time of the second data, a transmission frequency of the second data, a time slot in which the second data are transmitted, a frequency band in which the second data are transmitted, a frequency hopping pattern according to which the second data are transmitted, a time hopping pattern according to which the second data are transmitted and a time-frequency hopping pattern according to which the second data are transmitted.

In embodiments, the first data and the second data are different types of data. For example, the first data can be a beacon. The second data can be a data packet comprising payload data.

Subsequently, advantageous implementations of the transmitter are described.

In embodiments, the transmitter can be configured to assign at least one out of the non-unique addressing information and the further addressing information to the one receiver.

Thereby, the transmitter can be configured to assign the non-unique addressing information to the one receiver in dependence on operation parameters of the other receivers of the subset of the multiplicity of receivers, which are also addressed by the non-unique addressing information.

Thereby, the transmitter can configured to select the subset of receivers out of the multiplicity of receivers in dependence on operating parameters of the multiplicity of receivers, and to assign the non-unique addressing information to the selected subset of receivers.

For example, the operating parameters can be at least one out of physical limitations of the receivers, different owners of the receivers, and an expected number of transmissions to the receivers In embodiments, the transmitter can be configured to statically or dynamically re-assign the non-unique addressing information to the selected subset of receivers in response to changing operation parameters.

In embodiments, the transmitter can be configured to separate the data packet into a plurality of sub-data packets, each of the sub-data packets being shorter than the data packet, wherein the transmitter is configured to transmit the plurality of data packets using at least one out of a frequency hop pattern and time hop pattern.

Subsequently, advantageous implementations of the receiver are described.

In embodiments, the receiver can be configured to derive the non-unique address from the unique address. For example, the receiver can be configured to hash the unique address in order to obtain the non-unique address.

In embodiments, the receiver can be configured to receive the non-unique address from a transmitter or central unit.

In embodiments, the receiver can be configured to wake-up at a known transmission time or transmission time slot of the first data for receiving the first data.

In embodiments, the receiver can be configured to wake-up at a known transmission time or transmission time slot of the second data for receiving the second data, if the receiver is included in the subset selected by the addressing information in the first data. For example, the receiver can be configured to wake-up according to the expected addressing information for receiving the second data.

In embodiments, the receiver can be configured to stop receiving the second data if the second data does not comprise the further addressing information or is not received according to the further addressing information.

In embodiments, the second data can be a data packet that is transmitted separated into a plurality of sub-data packets, each of the sub-data packets being shorter than the data packet, wherein the plurality of data packets are transmitted using at least one out of a frequency hop pattern and time hop pattern. In that case, the receiver can be configured to receive the plurality of sub-data packets and to combine the plurality of sub-data packets, to obtain the data packet.

BRIEF DESCRIPTION OF THE DRAWINGS

Embodiments of the present invention will be detailed subsequently referring to the appended drawings, in which:

FIG. 24 shows a flowchart of a method 220 for forming a subset of receivers which share the same non-unique addressing information.

DETAILED DESCRIPTION OF THE INVENTION

Figure 1:
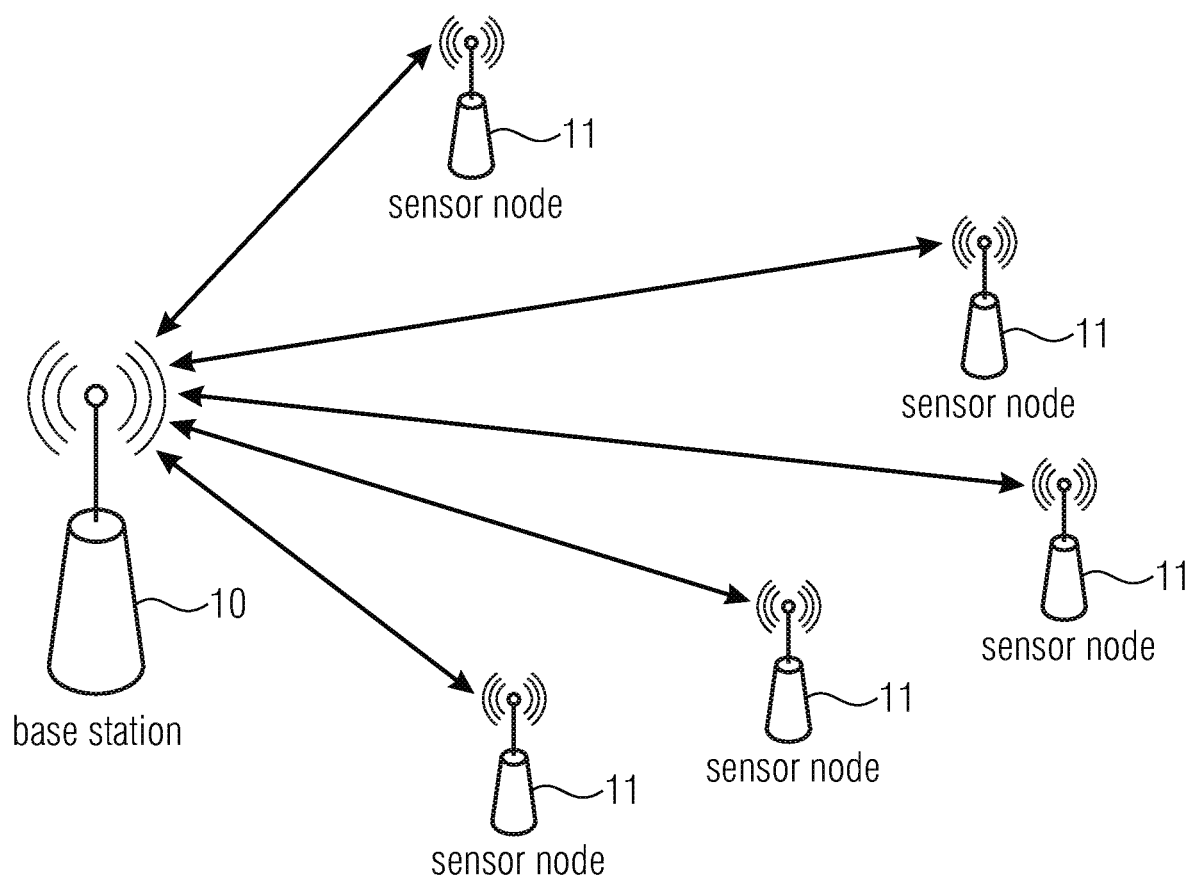
FIG. 1 shows a schematic diagram of a typical LPWAN setup with one base station and multiple sensor nodes.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 2:
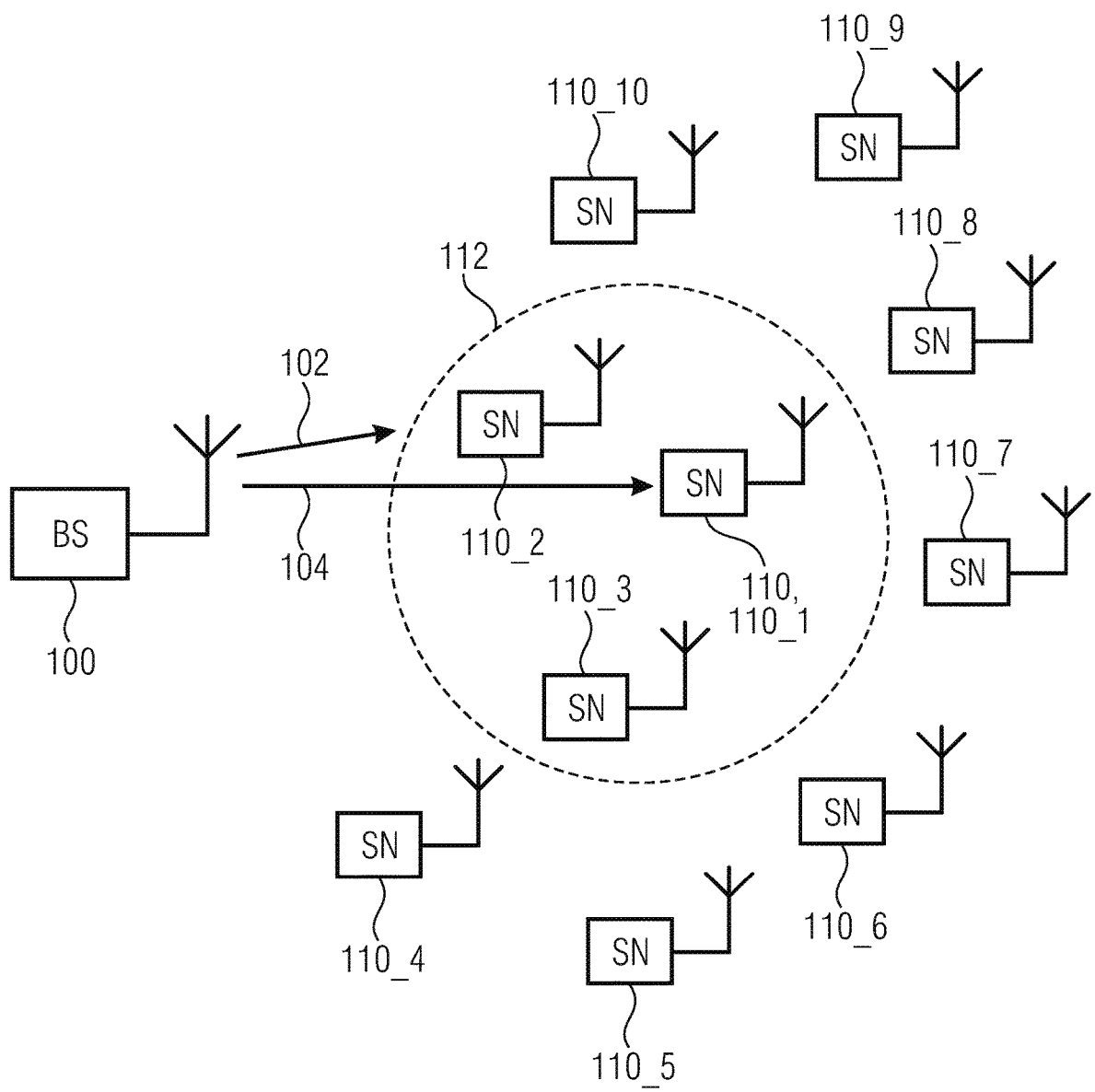
FIG. 2 shows a schematic block diagram of a communication system with a transmitter and a multiplicity of receivers, according to an embodiment.

FIG. 2 shows a schematic block diagram of a communication system comprising a transmitter 100 and a multiplicity of receivers 110_1 to 110_n, according to an embodiment.

Embodiments relate to a concept for addressing one receiver 110 (or a group of receivers) out of the multiplicity of receivers 110_1 to 110_n, for example, for transmitting data from the transmitter 100 to the one receiver 110.

The transmitter 100 is configured to communicate with a multiplicity of receivers 110_1 to 110_n, wherein the transmitter 100 is configured to transmit first data 102, the first data 102 comprising a non-unique addressing information addressing a subset 112 of the multiplicity of receivers 110_1 to 110_n, the subset 112 comprising at least two receivers.

For example, the non-unique addressing information transmitted with (or transmitted as) the first data 102 may address a subset 112 of receivers of the multiplicity of receivers 110_1 to 110_n, the subset 102 comprising at least two receivers. As shown by way of example in FIG. 2, the subset 112 of receivers may comprise three receivers, in detail, a first receiver 110_1, a second receiver 110_2, and a third receiver 110_3 of the multiplicity of receivers 110_1 to 110_n.

Further, the transmitter 100 is configured to transmit second data 104 comprising a further addressing information or being transmitted according to the further addressing information, the further addressing information addressing one receiver 110 (or one group of receivers) of the subset 112 of receivers of the multiplicity of receivers 110_1 to 110_n.

For example, the further addressing information transmitted with the second data or according to which the second data is transmitted, may address one receiver out of the subset 112 of receivers or a group of receivers out of the subset 112 of receivers. As shown by way of example in FIG. 2, the further addressing information may address the first receiver 110_1 of the subset 112 of receivers.

The receiver 110, e.g., the first receiver 110_1, has a non-unique address for communicating with the transmitter 100, wherein the receiver 110 is configured to receive the first data 102 comprising the non-unique addressing information and to determine whether he is addressed by the non-unique addressing information.

For example, the multiplicity of receivers 110_1 to 110_n of the communication system may receive the first data 102 comprising the non-unique addressing information and determine whether they are addressed by the non-unique addressing information. The non-unique addressing information may address a subset 112 of receivers, the subset 112 of receivers comprising, as shown by way of example in FIG. 2, the first receiver 110_1, the second receiver 110_2, and the third receiver 110_3. The other receivers of the multiplicity of receivers 110_1 to 110_n not being part of the subset 112 of receivers (e.g., fourth receiver 110_4 to tenths receiver 110_10) may switch to a standby mode after having determined that they are not addressed by the non-unique addressing information.

Further, the receiver 110 is configured to determine whether second data comprises an expected further addressing information or is transmitted according to the further addressing information if he is addressed by the non-unique addressing information, and to receive and process the second data if the second data comprises the expected further addressing information or is transmitted according to the expected further addressing information.

For example, the receivers of the subset 112 of receivers, e.g., the first receiver 110_1, the second receiver 110_2, and the third receiver 110_3 in the example shown in FIG. 2, may determine whether the second data comprises the expected further addressing information or is transmitted according to the further addressing information. The one receiver 110 of the subset 112 of receivers, e.g., the first receiver 110_1, may receive and process the second data 104 after having determined that he is addressed by the further addressing information. The other receivers of the subset 112 of receivers, e.g., the second receiver 110_2 and the third receiver 110_3, may switch to a standby mode after having determined that they are not addressed by the further addressing information.

Thus, in embodiments, instead of using a normal unique addressing information, a two-stage addressing scheme is used, wherein in first stage a non-unique addressing information (e.g., a short address) is used to non-uniquely address a subset 112 of a multiplicity of receivers 110_1 to 110_n of a communication system, the subset 112 of receivers comprising at least two receivers (e.g., the first receiver 110_1, the second receiver 110_2, and the third receiver 110_3), wherein in the second stage data (=second data 104) is transmitted to the subset 112 of receivers addressed in the first stage (i.e., to the first receiver 110_1, the second receiver 110_2, and the third receiver 110_3), the data comprising a second addressing information (e.g., a unique synchronization pattern) or being transmitted according to a second addressing information (e.g., a defined time slot, frequency band, or time/frequency hopping pattern), the second addressing information addressing one receiver (e.g., the first receiver 110_1) (or optionally a group of receivers) of the subset of receivers addressed in the first stage.

In embodiments, the non-unique address can be shorter (e.g., in bitlength) than a unique address uniquely addressing each receiver of the multiplicity of receivers. The further addressing information also can be a non-unique address addressing the one receiver 110 and also other receivers of the multiplicity of receivers, i.e. another subset of receivers of the multiplicity of receivers. However, with respect to the subset 112 of receivers addressed with the non-unique addressing information, the further addressing information is a unique address uniquely addressing the one receiver 110 out of the subset 112 of receivers. Thus, the non-unique addressing information and the further addressing information together uniquely address the one receiver 110 out of the multiplicity of receivers 110_1 to 110_n.

The further addressing information can be, for example, a data field in a data packet by means of which the second data is transmitted, a transmission time of the second data, a transmission frequency of the second data, a time slot in which the second data are transmitted, a frequency band in which the second data are transmitted, a frequency hopping pattern according to which the second data are transmitted, a time hopping pattern according to which the second data are transmitted and a time-frequency hopping pattern according to which the second data are transmitted.

In embodiments, the communication system can comprise up to n receivers 110_1 to 110_n, wherein n can be a natural number greater than or equal to three, n≥3. As shown by way of example in FIG. 2, the communication system can comprise, for example, n=10 receivers 110_1 to 110_n.

Further, the subset 112 of receivers may comprise at least m receivers, wherein m is a natural number greater than or equal to two, m≥2. Further, the number m of the subset 112 of receivers may be smaller than the number n of the multiplicity of receivers 110_1 to 110_n, m<n.

Figure 3:
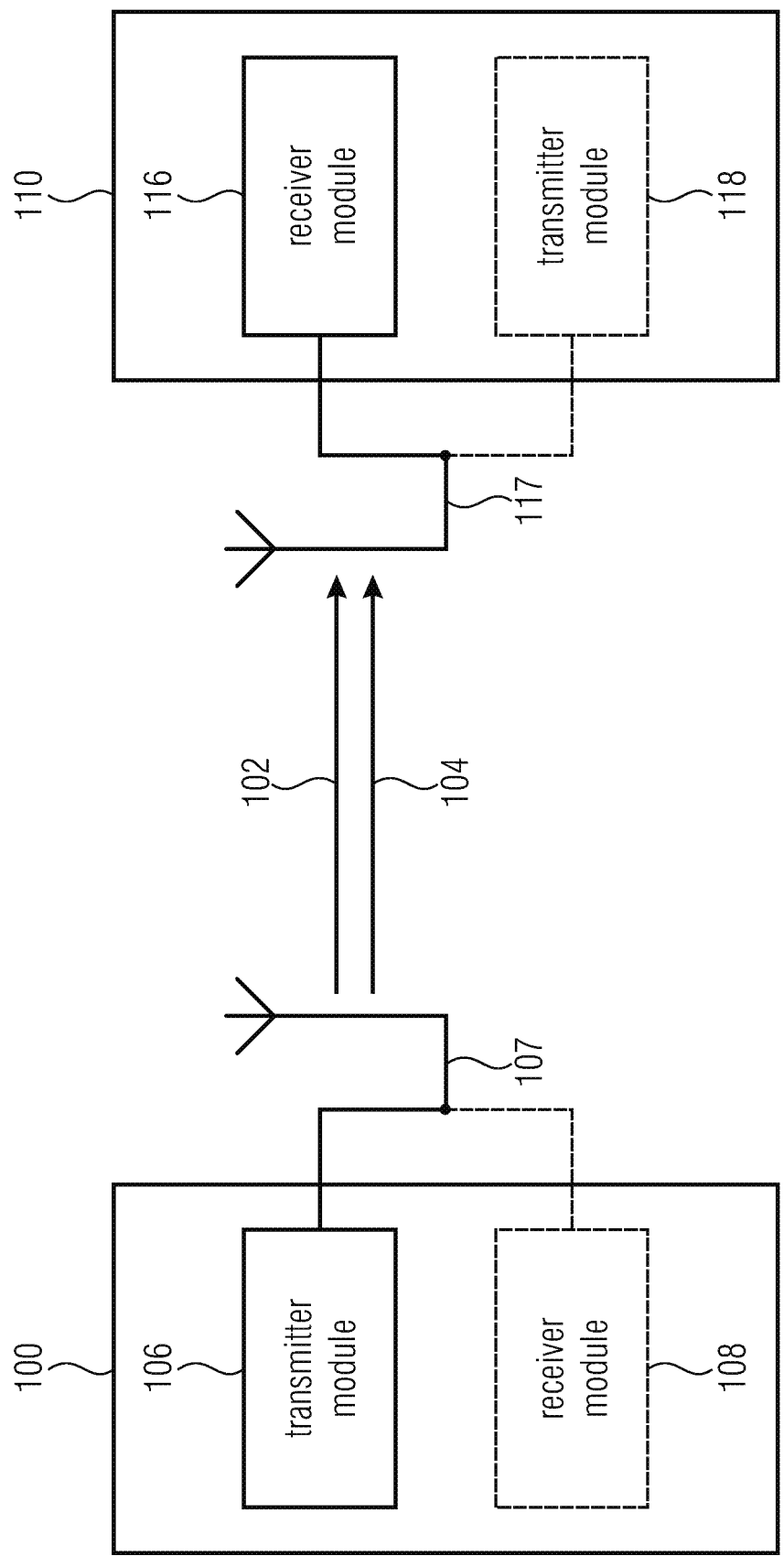
FIG. 3 shows a schematic block diagram of a transmitter and of a receiver, according to an embodiment.

FIG. 3 shows a schematic block diagram of the transmitter 100 and of the receiver 110, according to an embodiment.

The transmitter 100 can comprise a transmitter module 106 configured to transmit the first data 102 and the second data 104. The transmitter module 106 can be connected to an antenna 107 of the transmitter 100. Further, the transmitter 100 may optionally comprise a receiver module 108 for receiving data. The receiver module 108 may be connected to the antenna 107 or another antenna (not shown in FIG. 3) of the transmitter 100.

The receiver 110 can comprise a receiver module 116 configured to receiver the first data 102 and the second data 104. The receiver module 116 can be connected to an antenna 117 of the receiver 110. Further, the receiver 110 may optionally comprise a transmitter module 118 for transmitting data. The transmitter module 118 may be connected to the antenna 117 or another antenna (not shown in FIG. 3) of the receiver 100.

In embodiments, the transmitter 100 can be a base station of a communication system, wherein the receiver 110 can be a sensor node of a multiplicity of sensor nodes of the communication system. Naturally, also the transmitter 100 can be a sensor node, wherein the receiver 110 can be a base station. Further, both the transmitter 100 and the receiver 110 can be base stations or sensor nodes.

In embodiments, data packets can be used for transmitting the data (e.g., the first data 102 and/or the second data 104) from the transmitter 100 to the receiver 110. Further, the transmitter 100 and the receiver 110 can be configured to use data packet splitting (or telegram splitting). In detail, the transmitter 100 can be configured to separate the data packet into a plurality of sub-data packets, each of the sub-data packets being shorter than the data packet. The receiver 110 can be configured to receive the sub-data packets or at least a portion of the sub-data packets (e.g., especially when the data packet or sub-data packets are channel encoded, such that only a portion of the sub-data packets may be used for obtaining the data packet) and to combine the received sub-data packets in order to obtain the data packet. Thereby, the sub-data packets can be transmitted distributed in at least one out of time and frequency, e.g., at different transmission times or in different time slots, or using at least two different frequencies or frequency bandy or channels. The sub-data packets can be distributed in time and/or frequency according to a time hop pattern and/or frequency hop pattern. A time hop pattern may define the different transmission times or time slots at which the sub-data packets are to be transmitted. A frequency hop pattern may define the different frequencies, frequency bands, channels or sub-channels to be used for transmitting the sub-data packets.

Subsequently, detailed embodiments of the transmitter 100 and the receiver 110 are described. Thereby, it is assumed that the transmitter 100 is a base station and the receiver 110 a sensor node. However, the following description is also applicable to embodiments in which the transmitter 100 is a sensor node and the receiver 110 a base station, or to embodiments in which both, the transmitter 100 and the receiver 110 are base stations or sensor nodes.

Further, in the following description the transmitter 100 and receiver 110 may optionally use data packet splitting (or telegram splitting) for transmitting data. Naturally, the data packets may also be transmitted as a whole.

First Detailed Embodiment (Hash Based Preselection)

Sensor node addresses are typically multiple bytes in length to allow for unique identification of potentially billions of sensor nodes worldwide (e.g. IPv6 address or MAC address). Using the full address of the sensor node in the beacon results in long beacon transmissions and increased reception time and power consumption for the sensor nodes. This is especially true when downlink transmissions to many different sensor nodes or groups of sensor nodes may be used after each beacon.

In contrast to that, in embodiments, the non-unique addressing information is a short address shorter than a unique address uniquely identifying each of the multiplicity of receivers 110_1 to 110_n.

For example, the non-unique addressing information can be a hashed version of a unique address uniquely identifying each of the multiplicity of receivers 110_1 to 110_n.

Thus, in non-unique addressing mode (or hash based preselection mode), the address information in the beacon can be used to preselect a subset 112 of the sensor nodes 110_1 to 110_n which includes the actual recipients of imminent downlink transmissions. All preselected sensor nodes may then listen for a data transmission at a specified downlink slot. The addressed sensor nodes might either listen at different downlink slots for multiple unicast transmissions or listen at the same downlink slot for multicast transmissions to sensor node groups. Sensor node groups might be defined dynamically after the system setup and should not be dependent on the static sensor node address. The data transmission may include the full addressing information (might also be implicitly via encryption) allowing accidentally preselected sensor nodes to discard the transmission. Consequently, a downlink transmission can be seen as a twostep process, first a subset 112 of sensor nodes including the actual target sensor node 110 is addressed in a beacon and then the transmission is sent in the according downlink slot.

Figure 4:
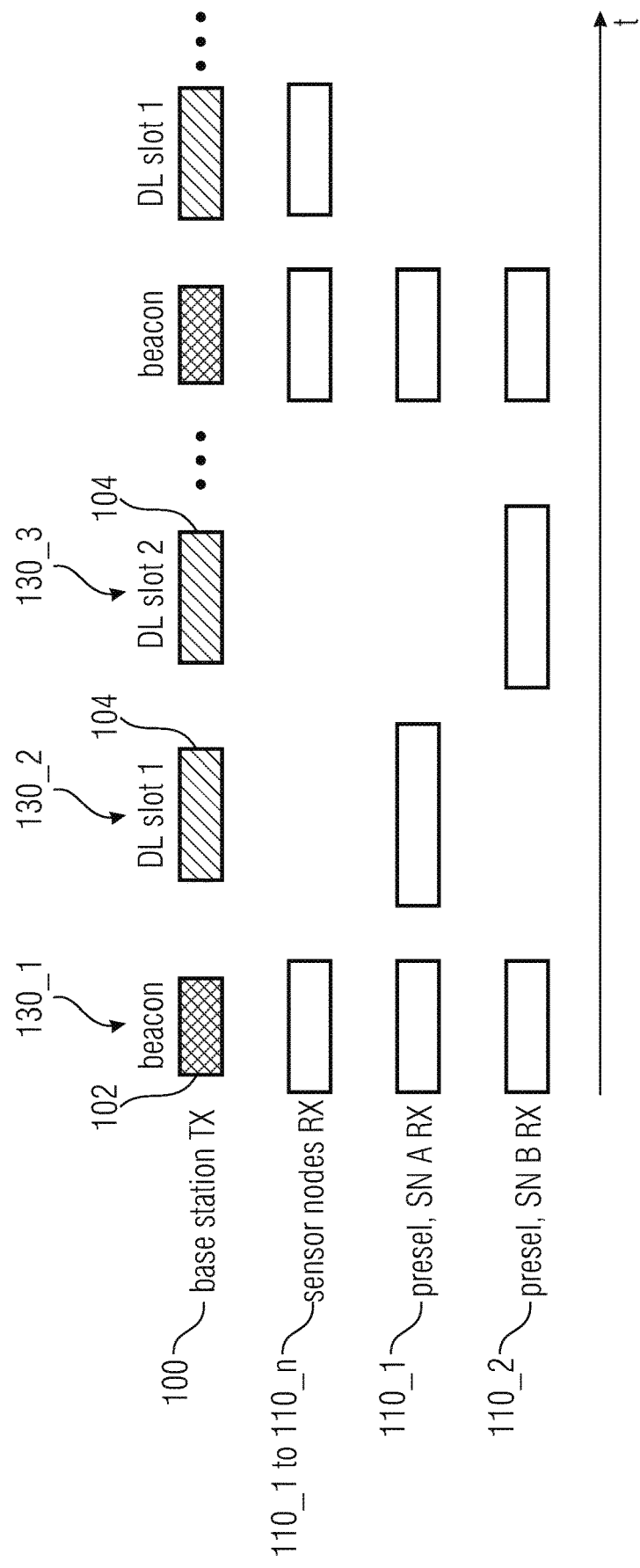
FIG. 4 shows in a diagram a downlink communication send and receive schedule of the base station and the sensor nodes.

FIG. 4 shows in a diagram a downlink communication send and receive schedule of the base station and the sensor nodes. Thereby, the abscissa describes the time. As shown in FIG. 4, in a first time slot 130_1 the base station 100 transmits the first data (e.g., a beacon) 102 with the non-unique addressing information. All sensor nodes including a first sensor node 110_1 and a second sensor node 110_2 listen in the first time slot 130_1 for the beacon of the base station 100. The first sensor node 110_1 and the second sensor node 110_2 are addressed by the non-unique addressing information. The first sensor node 110_1 and the second sensor node 110_2 are addressable by further addressing information. However, the first sensor node 110_1 and the second sensor node 110_2 correspond to different subsets of sensor nodes. In the example shown in FIG. 4, the further addressing information are specific time slots in which the respective sensor nodes expect a transmission from the base station 100. In detail, the first sensor node 110_1 expects a transmission from the base station 100 in a second time slot (DL slot 1) 130_2, i.e. the first sensor node 110_1 is addressed by a transmission of the second data 104 in the second time slot 130_2 (=further addressing information addressing the first sensor node 110_1), wherein the second sensor node 110_2 expects a transmission from the base station 100 in a third time slot (DL slot 2) 130_3, i.e. the second sensor node 110_2 is addressed by a transmission of the second data 104 in the third time slot 130_3 (=further addressing information addressing the second sensor node 110_2). Since the base station 100 transmits the second data 104 in both, the second time slot 130_2 and the third time slot 130_3, both sensor nodes 110_1 and 110_2 are addressed and receive and process the respective transmission from the base station 100.

Thus, the addressing scheme described herein provides the advantage of a lower power consumption for the sensor node due to reduced overall listening times.

In embodiments, the base station 100 uses the first data (e.g., a beacon) 102 to preselect a subset 102 of sensor nodes via a non-unique addressing information (or partial addressing information (e.g., hashes)). The subset 112 includes the actual downlink recipients (i.e., the one receiver 110). Only preselected sensor nodes listen for downlink transmissions in an explicitly or implicitly assigned transmission slot. The downlink transmission includes full addressing information (non-unique addressing information and further addressing information together form the unique or full addressing information), sensor nodes accidentally preselected may discard the transmission.

The challenge is to find an efficient way for the preselection to minimize the number of futile sensor node wake ups while maintaining high flexibility for addressing groups of sensor nodes with a very limited address data size. Additionally, the assignment of downlink transmission slots for each transmission may be considered.

Figure 5:
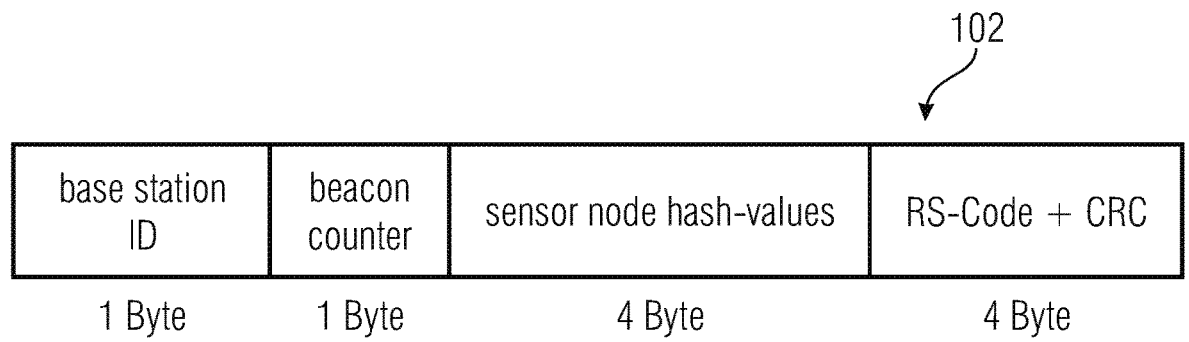
FIG. 5 shows a schematic view of a data structure of a beacon, according to an embodiment.

FIG. 5 shows a schematic view of a data structure of a beacon, according to an embodiment. As shown in FIG. 5, the first data 102 can be a beacon. The beacon can comprise, for example, a base station ID field having, e.g., 1 Byte, a beacon counter field having, e.g., 1 Byte, a sensor node hash-value field (=non-unique addressing information) having, e.g., 4 Byte, and a RS-Code and CRC field having, e.g., 1 Byte.

The base station 100 can be configured to use a subset forming function to form subsets of sensor nodes and to assign the same non-unique addressing information to the sensor nodes of each subset of sensor nodes.

For example, a non-unique address assigning function (e.g., hashing function) can map an address of arbitrary length to a non-unique addressing information (e.g., hash) of much shorter length. As a consequence of the length reduction, multiple addresses are mapped to the same non-unique addressing information (or same hash). For example, all elements mapped to the same hash may share the same hash bin. By specifying the non-unique addressing information (e.g., hash) of the sensor node for a downlink transmission in the beacon, the subset 112 of sensor nodes with this same non-unique addressing information (e.g., hash) can be preselected. A very simplistic non-unique address assigning function (e.g., hashing function) is to crop the sensor node address, resulting in a mask like subset division. Or, for example, a CRC of the desired length, computed over the sensor node address, can be used as non-unique addressing information (e.g., hash). Though the hash concept allows much more flexibility to adapt the subsets 112 or hash bins to various conditions.

Figure 6:
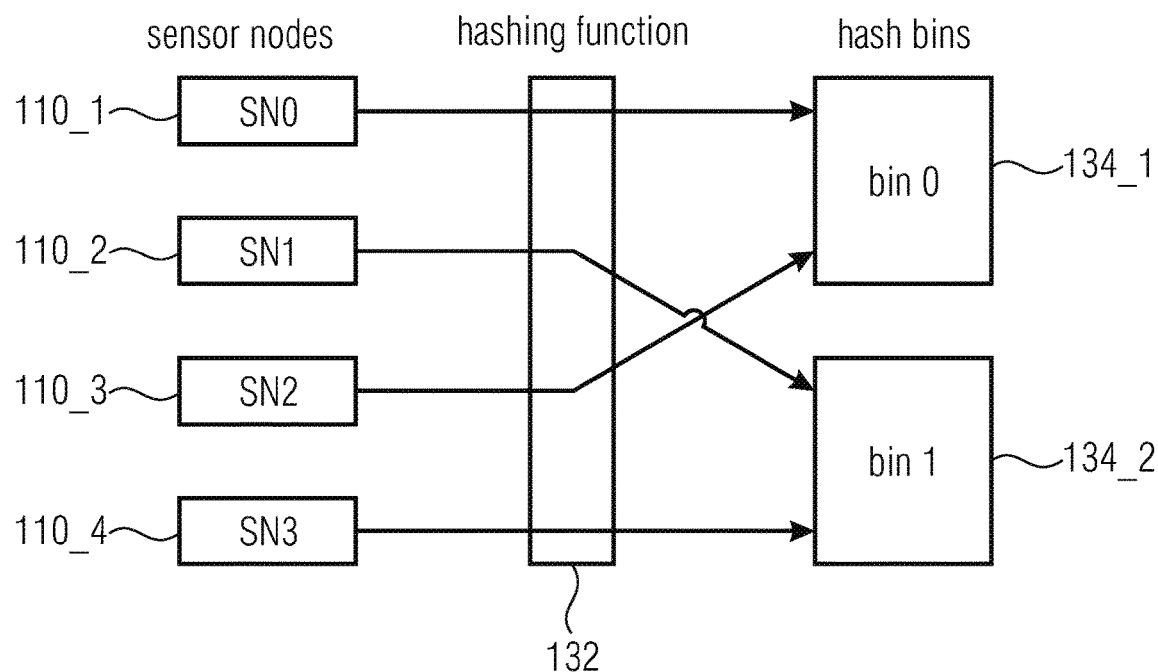
FIG. 6 shows a schematic view of an assignment of sensor nodes to hash bins via a hashing function.

FIG. 6 shows a schematic view of an assignment of sensor nodes to hash bins via a hashing function. As shown in FIG. 6, a first sensor node 110_1 can be assigned via a hashing function 132 to a first hash bin (e.g., bin 0) 134_1, wherein a second sensor node 110_2 can be assigned via the hashing function 132 to a second hash bin (e.g., bin 1) 134_2, wherein a third sensor node 110_3 can be assigned via a hashing function 132 to the first hash bin (e.g., bin 0) 134_1, and wherein the fourth sensor node 110_4 can be assigned via a hashing function 132 to the second hash bin (e.g., bin 1) 134_2.

Thereby, the base station 100 can be configured to form the different subsets of sensor nodes out of the multiplicity of sensor nodes 110_1 to 110_n in dependence on operating parameters of the multiplicity of sensor nodes 110_1 to 110_n, and to assign the same non-unique addressing information to the sensor nodes of each subset.

The operating parameters can be at least one out of physical limitations of the sensor nodes, different owners of the sensor nodes, and an expected number of transmissions to the sensor nodes.

As already mentioned, the non-unique address assigning function can be, for example, a hashing function. Usually hashing functions attempt to spread all possible input values evenly across hash bins though asymmetric bins can be used as an optimization technique. Sensor nodes 110_1 to 110_n with less strict power consumption constraints can be placed in larger hash bins as futile wakeups are less problematic. Another criterion can be the frequency of downlink transmissions, sensor nodes 110_1 to 110_n addressed more frequently can be mapped to smaller hash bins to reduce collateral sensor node wakeups. Further potential lies in the knowledge of actual present sensor nodes 110_1 to 110_n at the base station 100, while billions of possible addresses are available worldwide only a fraction of these are in the range of one base station 100. Addresses not reachable by the base station 100 can be preselected without any harm, allowing focusing the binning on actual present sensor node addresses.

In embodiments, a binning of sensor nodes 110_1 to 110_n based on power consumption constraints, rate of transmissions and/or actually present addresses can be performed.

The length of the non-unique addressing information (e.g., hashes) might also be variable to adapt to the system constellation. This allows dynamically adjusting the tradeoff between beacon length and preselection precision. For example, if the sensor node count at a base station 100 greatly varies during the lifetime of a system, the length of the non-unique addressing information (e.g., hash length) might be reduced while viewer sensor nodes are present.

In embodiments, the length of the non-unique addressing information (e.g., hash length) can be dynamically adapted to the system constellation.

Special consideration can also be dedicated to the handling of different companies. The address of a sensor node might contain a company specific part to allow assignment of certain address ranges to different companies. If sensor nodes 110_1 to 110_n of multiple companies are present at a base station 100, the company part of the address can be used to map different companies to different hash bins. This avoids inducing higher power consumption to the sensor node network of one company by the communication behavior of another company. As different companies might have very different targets for sensor node power consumption, battery lifetime or update frequency such a separation can be especially valuable. Also, attempt to intentionally negatively influence other company's sensor nodes can be considered here (e.g. drain other sensor nodes' batteries by targeting own sensor nodes in a certain hash bin). On the other hand, address ranges of companies with no deployed sensor nodes within the coverage of a base station can be omitted from considerations, reducing the relevant address space greatly and thus allowing more fine grained binning of actual present sensor node.

In embodiments, binning may separate sensor nodes of different companies to avoid cross-influence.

The principle of cross-influence can also be applied to different groups of sensor nodes in the same way. Instead of different companies the sensor node might just be assigned to different sets, tasks, projects, categories, etc. This can either be done in a setup exclusively operated by one company or be combined with the cross company handling in a shared system.

In embodiments, binning may separate sensor nodes of different projects, categories, etc. to avoid cross-influence.

In the case of large variances in the downlink transmission frequency between different sensor nodes 110_1 to 110_n it might not be desirable to hit the same sensor node with collateral wakeups for every transmission. For example, if some sensor nodes involve using very frequent transmissions, it should be avoided to wake up the same subset 112 of sensor nodes for each of these transmissions. The previously mentioned approach to map sensor nodes with higher transmission frequency to smaller subsets (e.g., hash bins) can help to reduce aggregated power consumption though sensor nodes within this bin are still drained very quickly. Also, combining all high frequency sensor nodes in one dedicated subset 112 (e.g., bin) is only acceptable if power consumption limitation can be ignored for those sensor nodes entirely. To allow better leveling of the power consumption across all sensor nodes, the subsets 112 (e.g., hash bins) can be shuffled for every beacon. This can be achieved by including the beacon counter or any other information included in the beacon like a CRC in the hashing function.

In embodiments, a shuffling of subsets 112 (e.g., hash bins) between beacon transmissions ca be performed to avoid a static cross-influence between the same sensor nodes for each transmission. Shuffling can be based, for example, on beacon counter or any other beacon data known to the receiver and the transmitter like the CRC.

As an alternative to shuffling of the subsets 112 of sensor nodes (e.g., hash bins), each sensor node might be assigned multiple non-unique addressing information (e.g., hashes). If the assignment of additional non-unique addressing information (e.g., hashes) uses information orthogonal to that used for previous non-unique addressing information (e.g., hashes), the sensor node is present in multiple subsets 112 of sensor nodes (e.g., hash bins) and shares each subset (or bin) with a different set of other sensor nodes. The base station 100 can then address a sensor node via different non-unique addressing information (e.g., hashes) and thus optimize the effect on other sensor nodes when addressing a certain sensor node 110 frequently. Additionally, the base station 100 can optimize the selection of the used non-unique addressing information (e.g., hash) based on the scheduled downlink transmissions. A sensor node can then be addressed via the non-unique addressing information (e.g., hash), which includes most other sensor nodes with pending downlink transmissions. This allows more effective use of multiple unicast downlink transmissions after one beacon.

In embodiments, multiple non-unique addressing information (e.g., hashes) can be assigned to every sensor node. The non-unique addressing information (e.g., hash) for addressing the sensor node can be selected based on optimization of impact to other sensor nodes power consumption and/or combining multiple downlink initiations after one beacon.

If multiple base stations operate within reception range of each other, the base station 100 might also coordinate the assignment of the non-unique addressing information (e.g., hash assignment). This can either be done actively via a dedicated communication channel or passively via listening to the others base stations transmission of first data (e.g., beacon transmission) and analyzation of the usage of the non-unique addressing information (e.g., hash usage). This is especially useful if it cannot be guaranteed, that every sensor node is tracking the first data 102 (e.g., beacon) broadcast of one base station exclusively.

In embodiments, information about non-unique addressing information (e.g., hash) usage at other base station within range can be retrieved either actively or passively. Further, an assignment of non-unique addressing information (e.g., hash assignment) can be adapted accordingly to optimize overall distribution of non-unique addressing information (e.g., hash distribution).

To allow targeting of arbitrary sensor node groups it might not be sufficient to select a suitable function for non-unique address assignment (e.g., a hashing function) in order to map group members to the same subset (e.g., hash bin). This is especially true if groups are meant to be formed dynamically after system setup where sensor nodes 110_1 to 110_n addresses are fixed. More flexibility can be gained by allowing the assignment of multiple non-unique addressing information (e.g., hashes) to one sensor node. For example, a dedicated set of group hashes, and associated hash bins, can be assigned to sensor nodes as secondary hashes. Sensor nodes have to match all assigned hashes to the preselection address information in a beacon, allowing to address sensor node groups as well as single sensor nodes the same way. If the sensor node address range includes dedicated address subsets for groups, the group hashes can be produced by simply mapping these address subsets like any other address. Otherwise group hashes can also be simply assigned from a reserved set within the hash range which is not used for address mapping. When a larger number of groups may be used, it might also be useful to combine groups and single sensor nodes in the same hash bin. In this case, the increased collateral power consumption needs to be considered for a futile group wakeup. Therefore, a combination of groups and sensor nodes with high transmission frequency should be avoided, for example.

In embodiments, dedicated hash bins can be used to address groups of sensor nodes. One or multiple group hashes can be assigned to a sensor node. Group hashes can be separated or combined with normal sensor node hash bins.

The beacon might also contain the hashing function itself or parts or parameters of the hashing function either directly or in a compressed form. The information for the hashing function can also be derived implicitly from other data in the beacon. This not only allows shuffling of bins between beacons but also the adaptation of the hashing function to the current downlink schedule. For example, the hashing function can be adapted to form bins according to currently pending downlink transmissions.

In embodiments, dynamically changing hashing function can be synchronized via a beacon. Further, the hashing function can be adapted to current transmission tasks.

Second Detailed Embodiment (Adaptive Hashing Algorithm)

In response to a changing constellation of the communication system, the base station 100 can be configured to statically or dynamically re-assign the non-unique addressing information to a selected subset 112 of sensor nodes, thereby forming new subsets of sensor nodes or adapting the subsets of sensor nodes. The base station 100 can be configured to use, for example, the non-unique address assigning function to statically or dynamically re-assign the non-unique addressing information.

In following description, it is exemplarily assumed that the non-unique address assigning function is a hashing function (e.g., as described above) and that the non-unique address information assigned to the different subsets of sensor nodes are hashes.

When the system constellation is highly dynamic or not known a priori, the static reservation of hash bins for different sensor node activity classes or companies is not a viable solution. In this case, an adaptive hashing algorithm can be used to optimize the hash bin distribution for the current state under the restriction of previously assigned hashes. Whenever a new sensor node is added to the system, the base station 100 may quantify the costs for an assignment of the new sensor node for each hash bin. The new sensor node can be assigned, for example, to the hash bin with the lowest additional costs.

Quantification of the costs can be done based on basic information about the sensor node like company, activity and power restrictions. Other criterions can be added if need be. The information can be provided to the base station by the sensor node itself or can be retrieved from other sources when the sensor node is registered at the base station. Power restrictions can be represented by a penalty value with higher values meaning a more limited power supply. Grid powered sensor node can use 0 as futile wakeups are virtually irrelevant. The costs within a hash bin can be computed as the product of the accumulated activity and the accumulated penalty. To consider cross-company influence (either accidental or intentional) the activity and penalty values can be accumulated separately for every company. A cross-company factor can be added when activity and penalty of different companies are multiplied. This allows controlling the level of tolerated cross-influence for the overall system optimization. Different cross-company factors might also be used for different company combinations, even asymmetric weighting is possible (cross-influence factor matrix). Again, the cross-company principles can also be applied to different groups, categories, etc. of sensor node to control cross-influence in the same way.

In embodiments, the impact of each sensor node on the system activity can be quantified via a set of sensor node attributes. New sensor nodes can be explicitly assigned, for example, to the hash bin with the least negative impact caused by the assignment.

Figure 7:
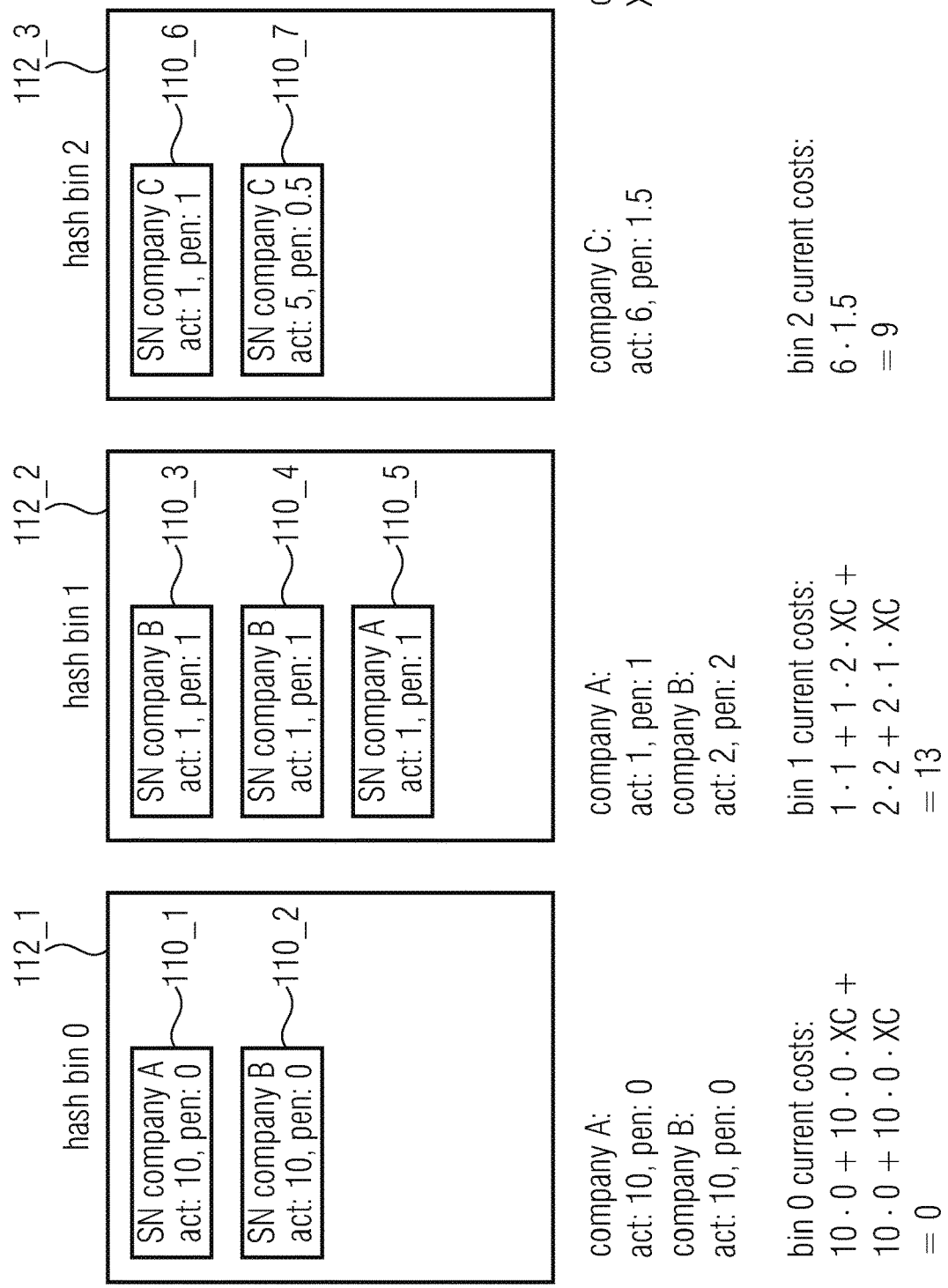
FIG. 7 shows a schematic view of a system setup with seven sensor nodes already assigned to three hash bins.

FIG. 7 shows a schematic view of a system setup with seven sensor nodes 110_1 to 110_7 already assigned to three hash bins 120_1 to 120_3. Thereby, FIG. 7 illustrates the principle with the help of a simplified setup with three hash bins 112_1 to 112_3 and seven sensor nodes 110_1 to 110_7 already assigned. The accumulated activity and penalty values as well as the computation of the current bin costs are shown below the bins 112_1 to 112_3. The calculation basically consists of the self-induced costs for every company and the costs induced by applying the company's activity on the penalty values of the other companies weighted with the cross company factor. Bin 0 112_1 contains two sensor nodes 110_1 and 110_2 with high activity but unrestricted power supply and thus currently shows a total cost of 0. Bin 1 112_2 contains three standard sensor nodes 110_3 to 110_5 operated by companies A and B resulting in total costs of 13. Bin 2 112_3 is exclusively occupied by sensor nodes 110_6 and 110_7 of company C and has a total cost of 9.

With this given system setup, a new sensor node 110_8 shall be assigned to the base station 100. The new sensor node 110_8 is operated by company C and has a high activity rating with relatively low power consumption restrictions. To decide which bin the new sensor node 110_8 is assigned to, the additional inflicted costs are computed for all thee bins 112_1 to 112_3. These costs consist of the self-induced costs of the new sensor node 110_8 and the costs induced by applying the added activity on the penalty of the present sensor node as well as the costs induced by applying the present activity on the added penalty. The self-induced costs are independent of the bin and are only included due to their contribution to the total costs after the assignment. The computations for the three hash bins are shown in FIG. 8.

Figure 8:
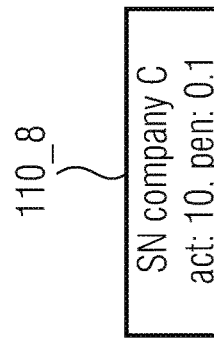
FIG. 8 shows a schematic view of the assignment of a new sensor node via an adaptive hashing algorithm.

FIG. 8 shows a schematic view of the assignment of a new sensor node 110_8 via an adaptive hashing algorithm. As indicated in FIG. 8, the costs for assigning the sensor node 110_8 to the bin 0 112_1 amount to

| | |
|---|---|
| 10 · 0.1 + | self induced costs of the sensor node + |
| (10 · 0 + 10 · 0) · XC + | effect of the new sensor node on present |
| (10 · 0.1 + 10 · 0.1) · XC = 5 | sensor nodes + effect of present sensor nodes on new sensor nodes = total costs of assignment |

The costs for assigning the sensor node 110_8 to the bin 1 112_2 amount to

| | |
|---|---|
| 10 · 0.1 + | self induced costs of the sensor node + |
| (10 · 1 + 10 · 2) · XC + | effect of the new sensor node on present |
| (1 · 0.1 + 2 · 0.1) · XC = 61.6 | sensor nodes + effect of present sensor nodes on new sensor nodes = total costs of assignment |

The costs for assigning the sensor node 110_8 to the bin 2 112_3 amount to

| | |
|---|---|
| 10 · 0.1 + | self induced costs of the sensor node + |
| 10 · 1.5 + | effect of the new sensor node on present sensor nodes + |
| 6 · 0.1 = 16.6 | effect of present sensor nodes on new sensor nodes = total costs of assignment |

As a result, the new sensor node 110_8 should be assigned to hash bin 0 112_1, raising its total costs to 5. An assignment to bin 1 112_2 would inflict massive costs due to high activity of the new sensor node 110_8 and the present penalty value of the present sensor node. Bin 2 112_3 has only sensor node of the same company assigned and has a lower accumulated penalty though the same effect applies to a lesser extent. Bin 0 112_1 is implicitly used as a high activity, low power restrictions bin as the assignment of high activity sensor nodes to bins with higher penalty sensor nodes results in permissive additional costs.

In contrast to a statistical distribution, the explicit assignment of hashes can avoid single sensor nodes with a high deviation in power consumption. Additionally, the activity of the sensor nodes can be weighted, e.g., quadratically or with even higher exponentiation to emphasize balancing of the activity at every sensor node over total system optimization. E.g., from the total system perspective it can be advantageous to assign a new sensor node to a bin which is preselected more frequently to avoid the impact of the new sensor node on another bin with many, but rarely addressed, sensor nodes already present. Giving more weight to the activity penalizes high deviations in the activity when assigning new sensor nodes.

In embodiments, an adaptable tradeoff between overall system optimization and balancing between each sensor node can be provided.

Due to the restrictions by previously assigned hashes, the adaptive hashing algorithm can result in less ideal bin distributions for certain sensor node insertion orders. Furthermore, the bin assignment can be dependent on the announced activity of a sensor node, which might not be accurate or change over time. The severity of such scenarios can be reduced by monitoring the actual activity of any sensor node and reassigning hash bins to sensor nodes with a high contribution to the bin activity when the imbalance threshold between bins is exceeded. Reassignment can be done, for example, in combination with regular data transmissions to minimize the overhead.

In embodiments, hash bin distribution can be monitored and sensor nodes with high impact can be re-assigned if the imbalance reaches a threshold.

If some statistical information about the expected sensor node characteristics is available, the results can be further improved. For example, if it is expected to a certain percentage of sensor nodes with very high activity an according fraction of the hash bins can be reserved for those sensor nodes. This reduces the dependency of the results on the order of the sensor node insertion.

In embodiments, available information about expected sensor node constellations can be used to improve assignment via preplanning and reservations.

Third Detailed Embodiment (Transmission Slot Selection)

The selection of the downlink transmission slot at which a preselected sensor node is listening can be done by splitting up the addressing information field in the beacon to include multiple hashes. Every hash field can be mapped to one downlink transmission slot following the beacon. This allows freely assigning slots to preselected nodes though reduces the available size for hashes and therefore increases the size of hash bins. As an alternative, the downlink transmission slot might be determined implicitly from the sensor node address. Depending on the system requirements, the slot assignment can either be orthogonal or parallel to the hash bins. Orthogonal means that sensor nodes in one hash bin are spread to different transmission slots and thus can be targeted with different unicast transmissions after one common preselection in a beacon. On the other hand, a parallel assignment of hash and transmission slot allows multicast transmissions to all sensor nodes preselected by one hash.

A trivial example for orthogonal assignment with $2^n$ available transmission slots can be the hashing over all but the n least significant bits of the address and usage of the n least significant bits as transmission slot number. Accordingly, a trivial example for parallel assignment would be the usage of the n least significant bits of the hash itself as the transmission slot number. To optimize for specific systems much more complex schemes might be used like involving the type of the sensor nodes or dedicated address ranges to determine the transmission slots in combination with the hash bins.

In general, the addressing of sensor nodes and selection of transmission slots can be seen as a multidimensional problem with the sensor node address being one dimension and the transmission slot being another dimension. If, for example, a separation of frequencies can be used in the system, a third dimension can be added for the frequency etc. This also applies to hopping patterns if telegram splitting technology is used as described above. In the addressing process via the beacon a subset of the address range can be mapped to the available time (slot) (and/or frequency etc.) range. The addressing information provided in the beacon can explicitly specify the mapping completely or partially, with the rest being implicitly determined from other information present at the sensor node and the base station like e.g. the full sensor node address. Changing the ration between explicit and implicit addressing allows a tradeoff between flexibility and precision of the sensor node preselection. For example, for every bit of the addressing information in the beacon which is used to explicitly assign transmission slots (frequencies, etc.) to the preselected sensor node, the preselected subset will be twice the size.

In embodiments, a selection of the transmission slot (frequency, etc.) can be performed explicitly or implicitly or a combination of both as a solution to a multidimensional addressing problem. Implicit selection can be performed, for example, orthogonal or parallel to explicitly selected bins depending on the system requirements.

Fourth Detailed Embodiment (Multi-Step Preselection)

In the interest to reduce the beacon size as much as possible the size of the included addressing information can be reduced. The optimal length of this information can be a tradeoff between, for example, power consumption for the beacon reception and power consumption in the additionally preselected nodes for the reception of downlink transmissions not concerning these nodes. While the futile reception of the full transmission can be rather expensive for the preselected sensor node, an increase in beacon size raises power consumption in all sensor nodes. A compromise between these options can be the usage of a multi-step preselection by splitting the beacon into a core part and extensions. Each part includes, for example, dedicated error correction information to allow independent decoding.

Figure 9:
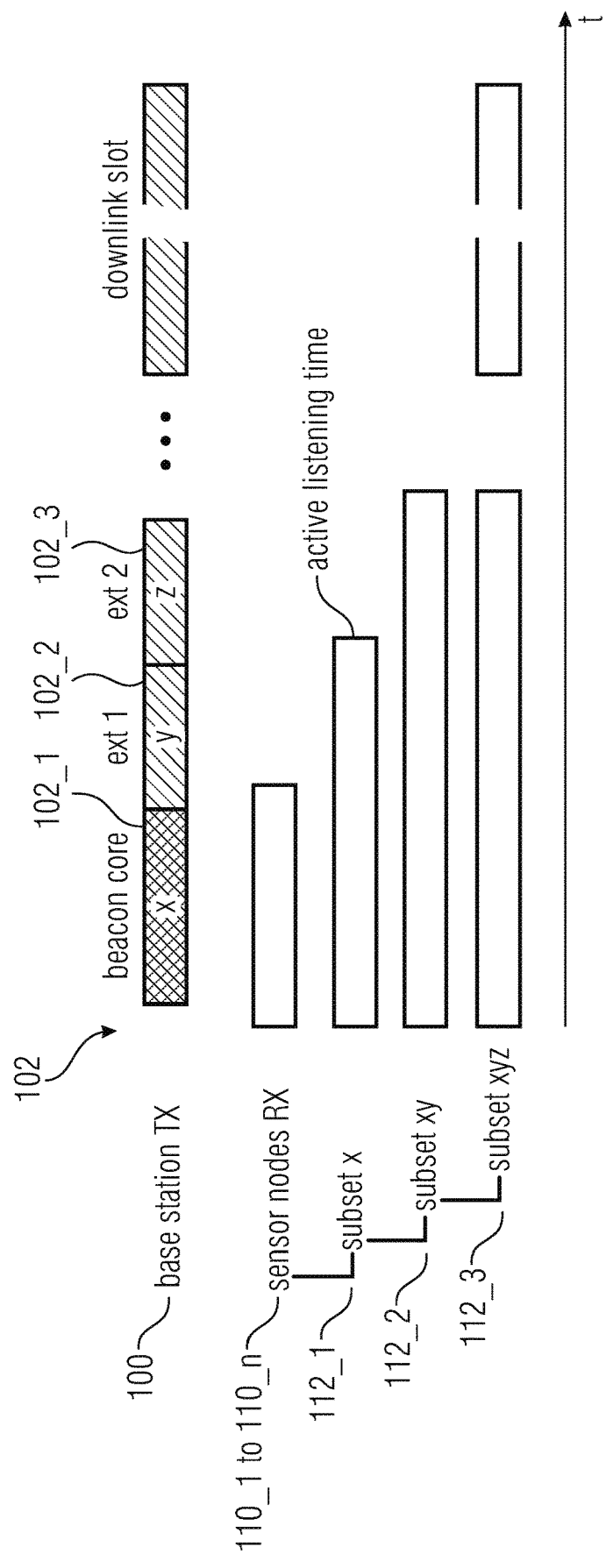
FIG. 9 shows a schematic view of a multi-step preselection with beacon core and extensions as contiguous transmission.

FIG. 9 shows a schematic view of a multi-step preselection with beacon core and extensions as contiguous transmission. Thereby, the abscissa denotes the time. As shown in FIG. 9, the beacon 102 comprises a core sequence 102_1 and at least a first extension sequence 102_2 and a second extension sequence 102_3. When the base station 100 starts the transmission of the beacon 102 with the core sequence 102_1, all sensor nodes 110_1 to 110_n listen to the transmission. After having received the core sequence 102_1 of the beacon 102, only the subset 112_1 of sensor nodes being addressed by the non-unique addressing information of the core sequence 102_1 of the beacon 102 continue listening the transmission of the first extension sequence 102_2 of the beacon 102, while the other sensor nodes, which are not addressed by the non-unique addressing information of the core sequence 102_1 discard reception (e.g., switch to a standby mode). After having received the first extension sequence 102_2 of the beacon 102, only the subset 112_2 of sensor nodes being addressed by the non-unique addressing information of the first extension sequence 102_2 of the beacon 102 continue listening the transmission of the second extension sequence 102_3 of the beacon 102, while the other sensor nodes, which are not addressed by the non-unique addressing information of the first extension sequence 102_2 discard reception (e.g., switch to a standby mode). After having received the second extension sequence 102_3 of the beacon 102, only the subset 112_3 of sensor nodes being addressed by the non-unique addressing information of the second extension sequence 102_2 of the beacon 102 continue listening the transmission of the base station 100, while the other sensor nodes, which are not addressed by the non-unique addressing information of the second extension sequence 102_3 discard reception (e.g., switch to a standby mode).

Further, as shown in FIG. 9, the core part 102_1 of the beacon 102 may contain the first section of the addressing information which narrows down the sensor nodes to a larger subset. All other sensor nodes can abort the beacon reception after the core part 102_1. One or multiple extensions 102_2 and 102_3 to the beacon add more precision to the addressing information, reducing the preselected sensor node subset. This allows minimizing the number of sensor nodes which are accidentally preselected without increasing the beacon reception time for all sensor nodes. The reception of a beacon extension typically involves using far less energy than the reception of the downlink telegram, therefore reducing the overall power consumption across the involved sensor nodes.

In embodiments, the sensor nodes might not be capable of receiving and processing the received information at the same time. In this case, a gap of defined duration can be inserted between the beacon parts. This allows for evaluation of the previous part in the sensor node to decide about the further beacon reception before the next part is transmitted, as shown in FIG. 10.

Figure 10:
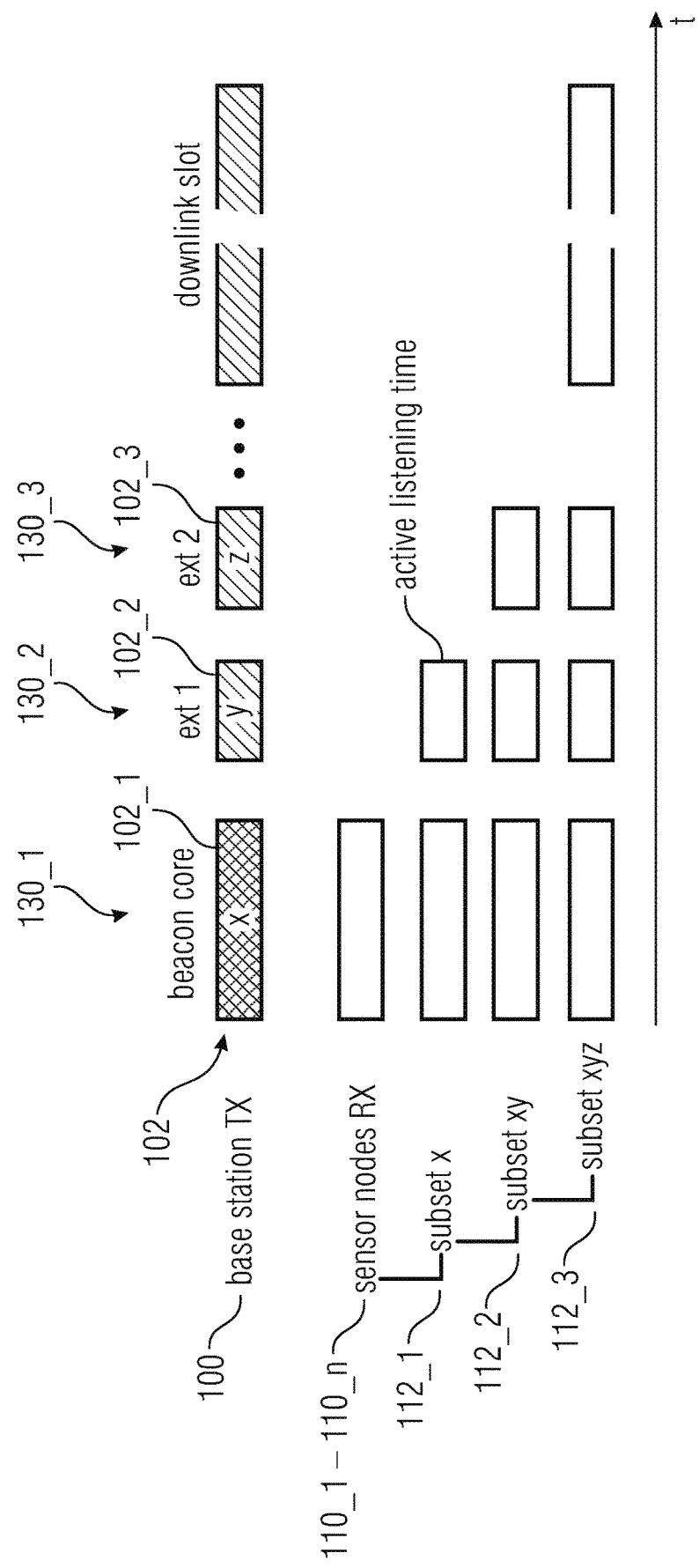
FIG. 10 shows a schematic view of a multi-step preselection with beacon core and extensions as separated transmission.

FIG. 10 shows a schematic view of a multi-step preselection with beacon core and extensions as separated transmission. Thereby, the abscissa denotes the time. As shown in FIG. 10, the beacon 102 comprises a core sequence 102_1 and at least a first extension sequence 102_2 and a second extension sequence 102_3, which are transmitted in different time slots 130_1 to 130_2. When the base station 100 starts the transmission of the beacon 102 with the core sequence 102_1 in the first time slot 130_1, all sensor nodes 110_1 to 110_n listen to the transmission. After having received the core sequence 102_1 of the beacon 102 during the first time slot 130_1, only the subset 112_1 of sensor nodes being addressed by the non-unique addressing information of the core sequence 102_1 of the beacon 102 continue listening the transmission of the first extension sequence 102_2 of the beacon 102 in the second time slot 130_2, while the other sensor nodes, which are not addressed by the non-unique addressing information of the core sequence 102_1 discard reception (e.g., switch to a standby mode). After having received the first extension sequence 102_2 of the beacon 102 during the second time slot 130_2, only the subset 112_2 of sensor nodes being addressed by the non-unique addressing information of the first extension sequence 102_2 of the beacon 102 continue listening the transmission of the second extension sequence 102_3 of the beacon 102 in the third time slot 130_3, while the other sensor nodes, which are not addressed by the non-unique addressing information of the first extension sequence 102_2 discard reception (e.g., switch to a standby mode). After having received the second extension sequence 102_3 of the beacon 102 in the third time slot 130_3, only the subset 112_3 of sensor nodes being addressed by the non-unique addressing information of the second extension sequence 102_3 of the beacon 102 continue listening the transmission of the base station 100, while the other sensor nodes, which are not addressed by the non-unique addressing information of the second extension sequence 102_3 discard reception (e.g., switch to a standby mode).

In embodiments, the addressing information can be split into multiple parts which can be received by the sensor nodes one by another. Each part narrows the addressed subset down, sensor nodes not addressed can abort the reception of further parts. An optional gap between parts grants processing time for the sensor nodes.

Fifth Detailed Embodiment (Partial Spectrum Beacon)

The beacon transmission might only use a part of the spectrum available to the base station 100 for the communication with the sensor nodes. The remaining spectrum can be used by the base station 100 to transmit downlink data for specific sensor nodes or groups of sensor nodes. The same principle can be applied to multi-step preselection when the core and one or multiple extensions are placed in different parts of the spectrum. This can also be combined to place a multi-part beacon and downlink payload data in different parts of the spectrum. The spectral division of the different components might e.g. be by frequency (FDMA), code (CDMA) or telegram splitting (hopping patterns), as will become clear from FIGS. 11 and 12.

Figure 11:
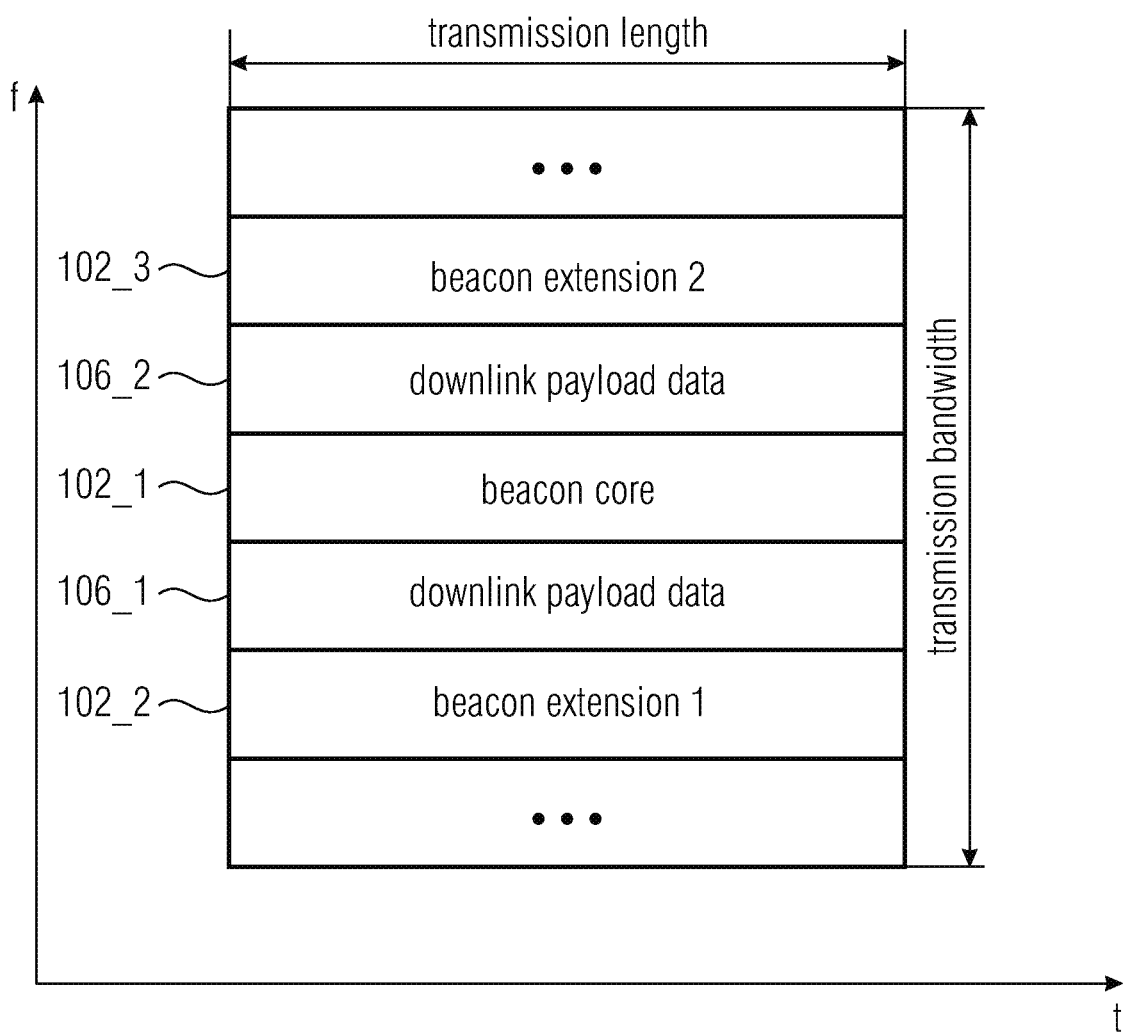
FIG. 11 shows in a diagram a transmission of beacon core, beacon extensions and payload data combined via frequency division.

FIG. 11 shows in a diagram a transmission of beacon core 102_1, beacon extensions 102_2 and 102_3 and payload data 106_1 and 106_2 combined via frequency division. Thereby, the ordinate denotes the frequency and the abscissa the time.

Figure 12:
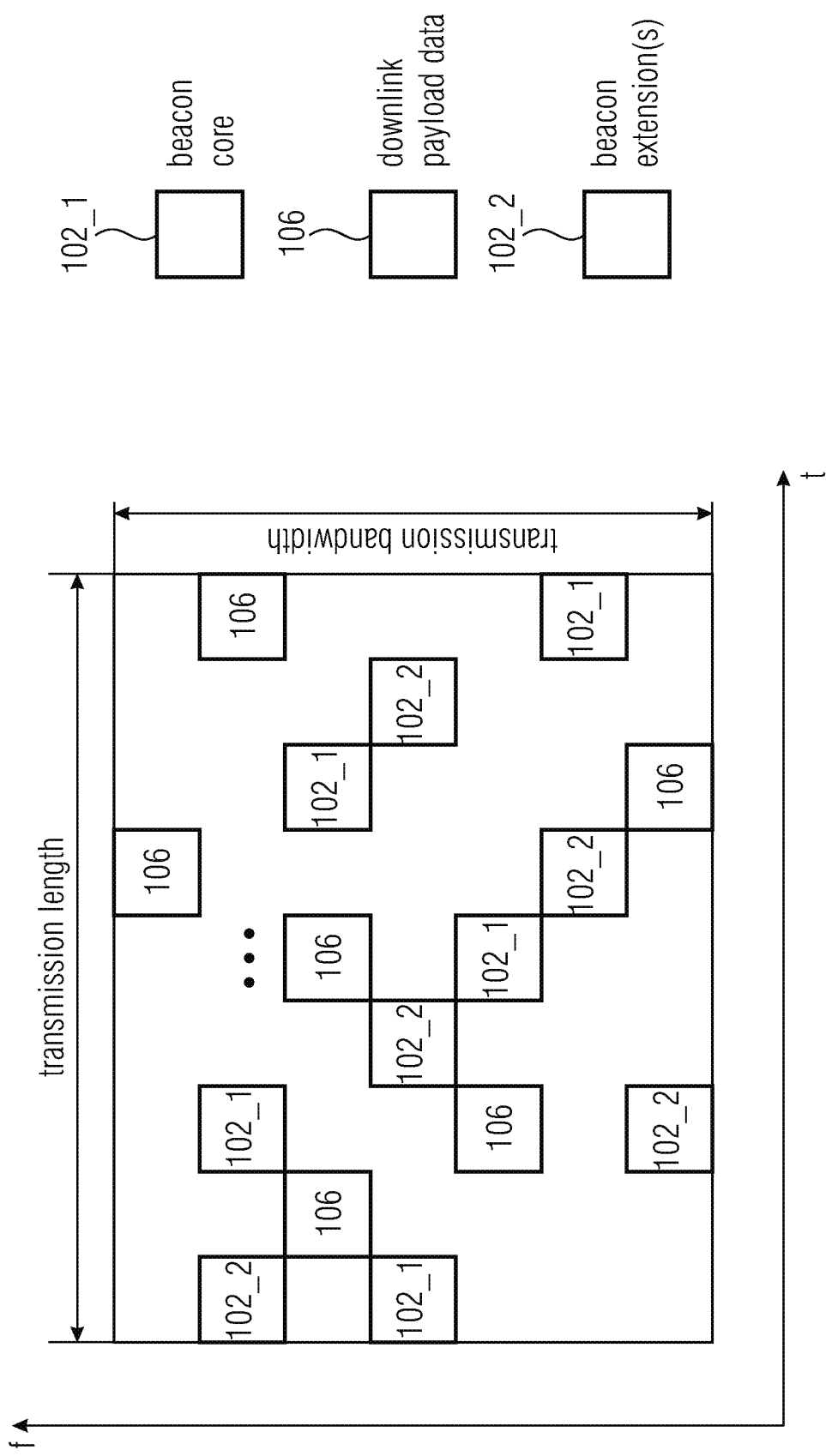
FIG. 12 shows in a diagram a transmission of beacon core, beacon extensions and payload data combined via different hopping patterns.

FIG. 12 shows in a diagram a transmission of beacon core 102_1, beacon extensions 102_2 and payload data 106 combined via different hopping patterns. Thereby, the ordinate denotes the frequency and the abscissa the time.

The sensor nodes receive with, for example, the full bandwidth during beacon transmissions but initially only process the partial spectrum which contains the beacon 102 or beacon core 102_1 either directly or after finishing the reception. This allows the sensor nodes to reduce the processing effort for beacon transmissions. If a sensor node is preselected in the beacon core 102_1 it processes further parts of the transmission. For multi-step preselection, the procedure can be repeated for every beacon extension 102_2 and 102_3. Finally, the downlink payload data 106 might be extracted from the received signal by addressed sensor nodes or the addressed sensor nodes will listen for the downlink payload transmission in a separate time slot.

In embodiments, beacon and extensions of the beacon and/or downlink payload data can be combined within the available bandwidth in different parts of the spectrum. Sensor nodes may receive, for example, full bandwidth but only process the parts of the transmission relevant to them.

Simulations

In the following, simulation results for different scenarios and hashing techniques are presented. The relevant system parameters are listed at the beginning of each scenario. The subsections present the statistical distribution of the sensor node activity for specific hashing techniques.

Figure 13:
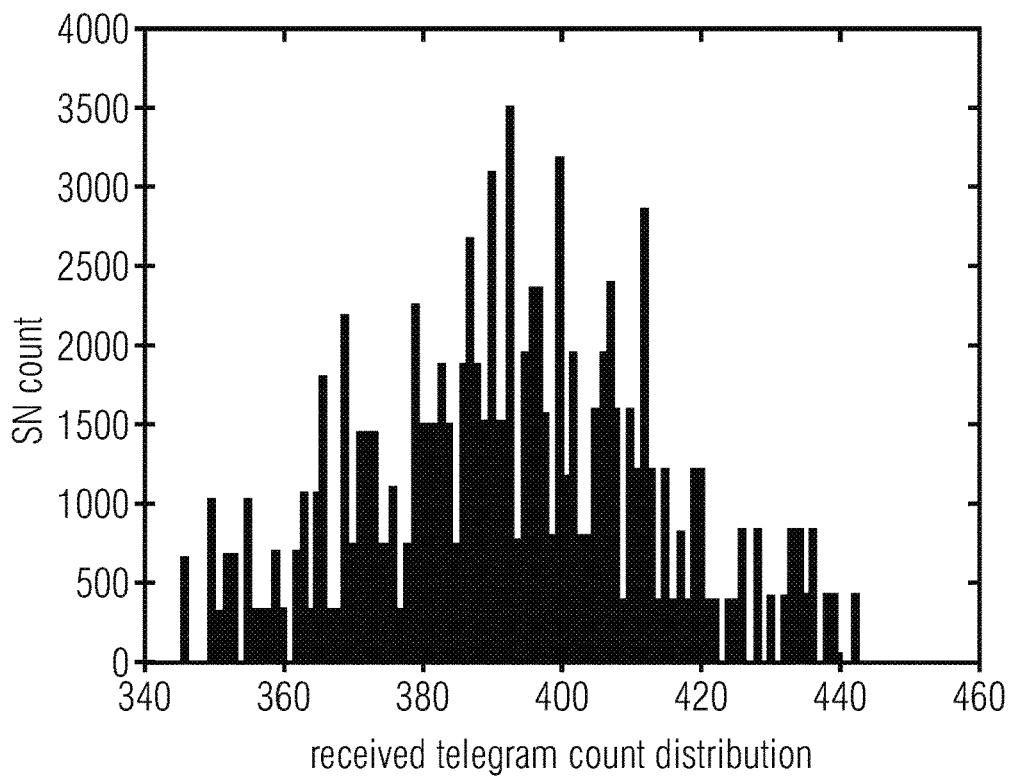
FIG. 13 shows in a diagram a distribution of the received telegram count for random addresses and modulo hashing.

Simulation Results for Random Sensor Node Addresses
Thereby, the following parameters were used:
100000 sensor nodes with random 48 bit address
One downlink transmission for each sensor node (100000 total transmissions)
Hashing function can be arbitrary as random address guarantees good distribution
No advantage of more sophisticated statistical hashing can be demonstrated
For a first simulation, the following 8 bit hash was used (modulo hash):
sensor node address % 256 (=remainder of integer division of the sensor node address by 256), was used (modulo hash).
The first simulation yields the following results:
Mean: 391.716800 (0.4%)
Std. dev.: 20.655329
Min: 345
Max: 442
For the first simulation it can be noted that:
A separation of sensor nodes to 256 bins reduces received telegrams for each sensor node to about 100000/256=390.625
The most active sensor node had to receive 28% more telegrams than least active sensor node.
For the first simulation, FIG. 13 shows in a diagram a distribution of the received telegram count for random addresses and modulo hashing. In FIG. 13, the ordinate denotes the number of sensor nodes (sensor node count), wherein the abscissa denotes the received telegram count distribution.

For a second simulation, an 8 bit hash explicitly assigned via adaptive hashing algorithm was used (adaptive hashing).
The second simulation yields the following results:
Mean: 390.63 (0.4%)
Std. dev.: 0.48397
Min: 390
Max: 391
For the second simulation it can be noted that:
Sensor nodes are evenly distributed across the hash bins
Received telegram count is either 390 or 391
Explicit assignment avoids statistical spread of received telegrams
Idealized result as announced activity might not be perfectly accurate in reality
Simulation Results for Clusters of Sensor Node Addresses
Thereby, the following parameters were used:
100000 sensor node, addresses consecutive within clusters of 32 addresses, random cluster prefix
One downlink transmission for each sensor node
Trivial address truncation uses only an eighth of the hash bins
Problem can be solved with any uniform hash function, no specific problem for this application
i.e. Simple XOR hash eliminates the problem
For a third simulation, the following 8 bit hash was used (modulo hash):
sensor node address % 256
The third simulation yields the following results:
Mean: 3125.000000 (3.1%)
Std. dev: 0.000000
Min: 3125
Max: 3125

For a fourth simulation, the following 8 bit hash was used (adaptive hashing):
- 8 bit XOR over sensor node address The fourth simulation yields the following results:
- Mean: 391.376960 (0.4%)
- Std. dev: 17.090535
- Min: 364
- Max: 418

Simulation Results for High Activity Sensor Nodes

Thereby, the following parameters were used:
- 100000 sensor node with random address
- 100 of these sensor nodes with 100 downlink transmissions per sensor node
- Remaining sensor node with 1 downlink transmission each (109900 total transmissions)
- Optimized hash bins for high activity sensor node to reduce collateral wakeups
- Hash bin shuffling to improve power consumption balance across sensor node For a fifth simulation, an 8 bit Hash, i.e., sensor node address % 256, was used (modulo hash).

The fifth simulation yields the following results:
- Mean: 430.718620 (0.4%)
- Std. dev.: 66.550649
- Min: 346
- Max: 698

Figure 14:
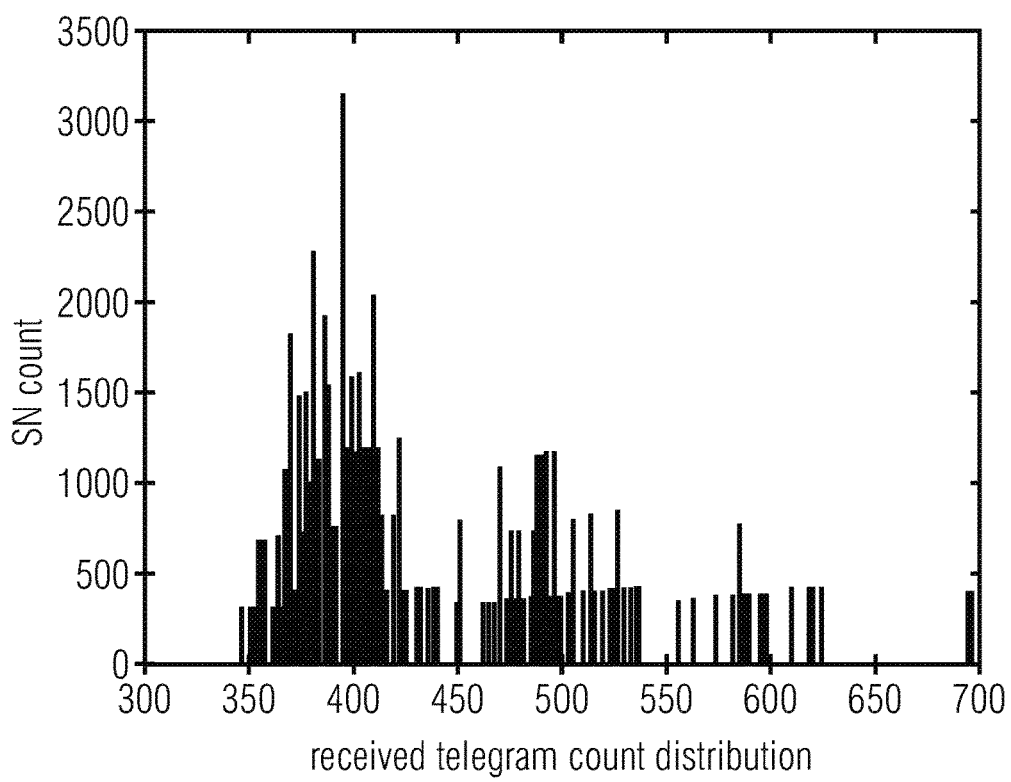
FIG. 14 shows in a diagram a distribution of the received telegram count with high activity sensor nodes and modulo hashing.

For the fifth simulation, FIG. 14 shows in a diagram a distribution of the received telegram count with high activity sensor nodes and modulo hashing. In FIG. 14, the ordinate denotes the number of sensor nodes (sensor node count), wherein the abscissa denotes the received telegram count distribution.

For a sixth simulation, the following hash was used (modulo hash+reserved bins):
- Bins 0-23 reserved for high activity sensor node
- 8 bit Hash for normal sensor node: (address % (256−24))+24
- 8 bit Hash for high activity sensor node: address % 24

The sixth simulation yields the following results:
- Mean: 431.609400 (0.4%)
- Std. dev.: 20.945483
- Min: 200
- Max: 700

Figure 15:
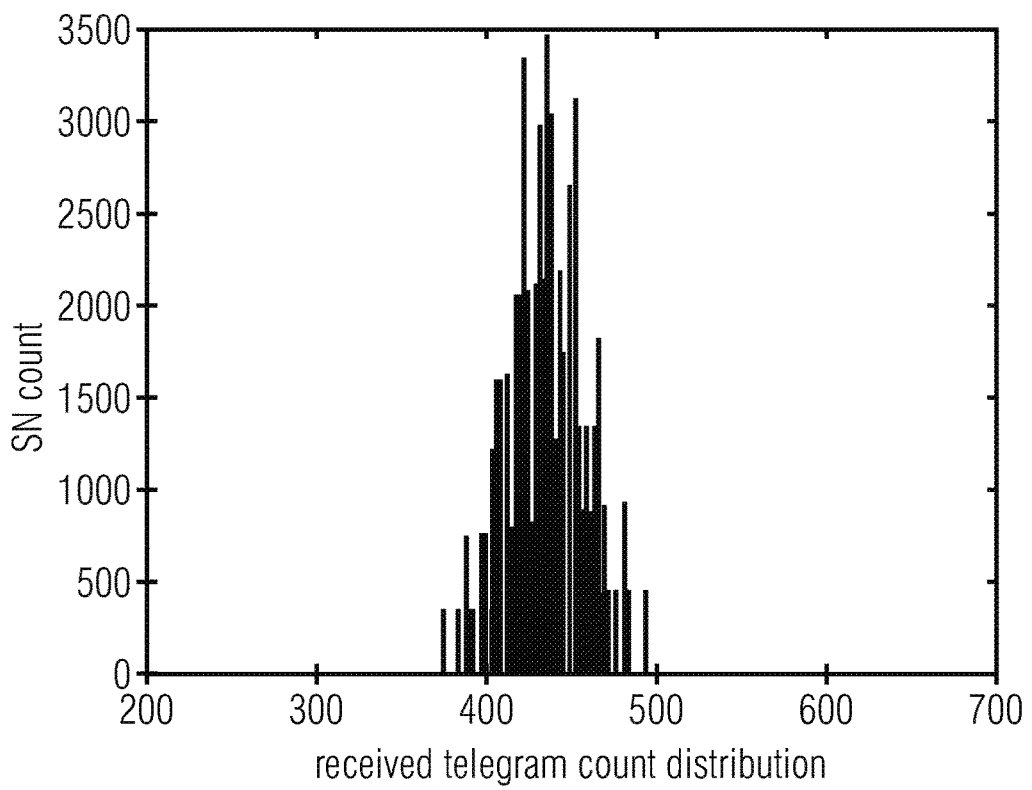
FIG. 15 shows in a diagram a distribution of the received telegram count with high activity sensor nodes and reserved bins.

For the sixth simulation it can be noted that:
- The overall system balance vastly improved
- Low count of high activity sensor node causes suboptimal distribution to reserved bins
- Still some sensor nodes with very high receive counts For the sixth simulation, FIG. 15 shows in a diagram a distribution of the received telegram count with high activity sensor nodes and reserved bins. In FIG. 15, the ordinate denotes the number of sensor nodes (sensor node count), wherein the abscissa denotes the received telegram count distribution.

For a seventh simulation, an 8 bit hash explicitly assigned via adaptive hashing algorithm was used. Thereby, high activity sensor nodes were assigned first. Further, an activity priority parameter of 1 was used. Consequently, no special focus is set to the balancing of sensor node activity over the total system optimization.

The seventh simulation yields the following results:
- Mean: 427.80 (0.4%)
- Std. dev.: 23.720
- Min: 410
- Max: 460

Figure 16:
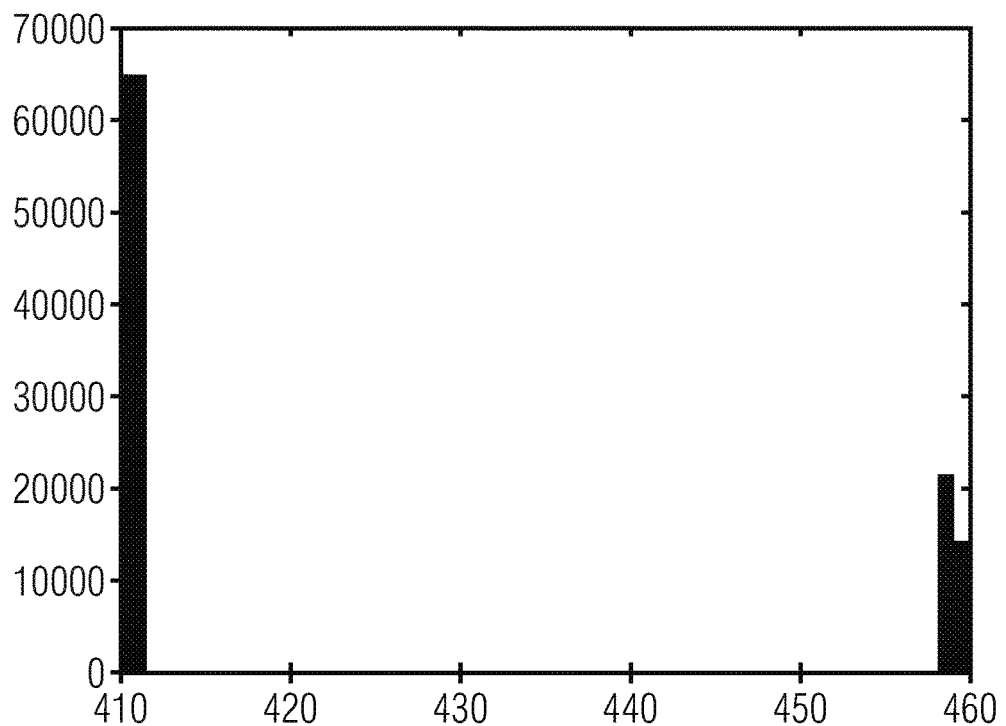
FIG. 16 shows in a diagram a distribution of the received telegram count with high activity Sensor Nodes and adaptive hashing without activity priority.

For the seventh simulation it can be noted that:
- Some standard sensor nodes are placed in bins with high activity sensor node
- Optimization for total system effort not ideal for standard deviation For the seventh simulation, FIG. 16 shows in a diagram a distribution of the received telegram count with high activity Sensor Nodes and adaptive hashing without activity priority. In FIG. 16, the ordinate denotes the number of sensor nodes (sensor node count), wherein the abscissa denotes the received telegram count distribution.

For an eights simulation, an 8 bit hash explicitly assigned via adaptive hashing algorithm was used. Thereby, high activity sensor nodes were assigned first. Further, an activity priority parameter of 2 was used. Consequently, the activity is weighted quadratic resulting in an increased penalization of activity deviations.

The eighth simulation yields the following results:
- Mean: 429.25 (0.4%)
- Std. dev.: 0.43391
- Min: 429
- Max: 430

Figure 17:
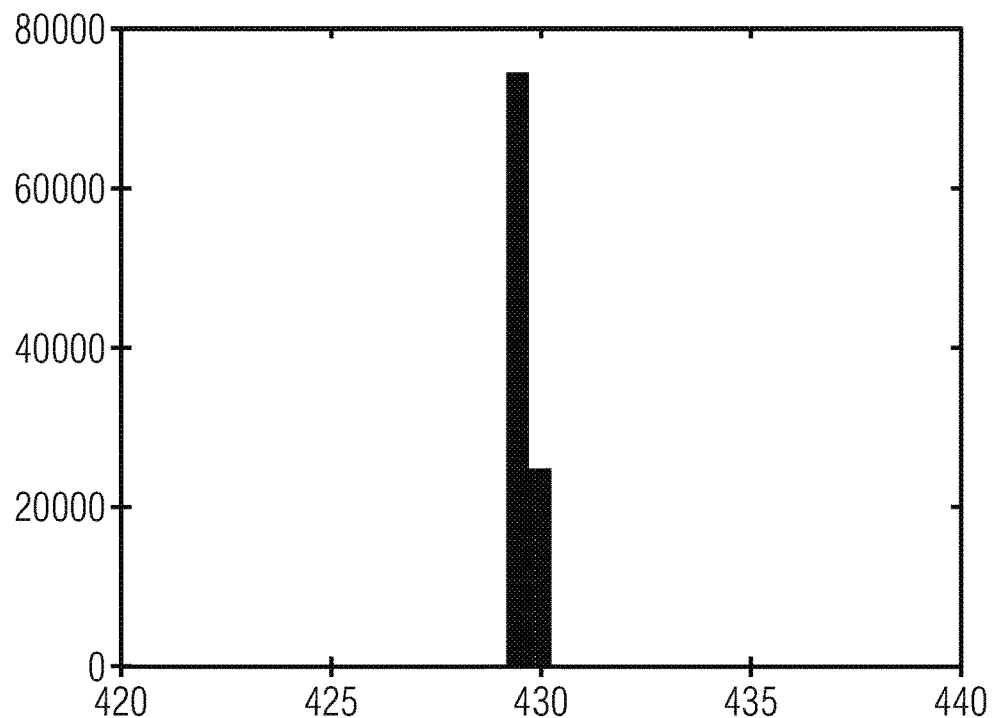
FIG. 17 shows in a diagram a distribution of the received telegram count with high activity Sensor Nodes and adaptive hashing with quadratic activity priority.

For the eighth simulation it can be noted that:
- Giving higher priority to activity balancing optimizes standard deviation
- Mean is only marginally increased due to better balancing For the eighth simulation, FIG. 17 shows in a diagram a distribution of the received telegram count with high activity Sensor Nodes and adaptive hashing with quadratic activity priority. In FIG. 17, the ordinate denotes the number of sensor nodes (sensor node count), wherein the abscissa denotes the received telegram count distribution.

Simulation Results for Company Cross Influence

Thereby, the following parameters were used:
- 100000 sensor nodes, 25000 per company share common 16 MSB of address as company ID
- 10 downlink transmissions per sensor node for company 0
- One downlink transmission per sensor node for others (325000 total transmissions)
- Optimized hashing to avoid influencing of other company sensor node For a ninth simulation, the following 8 bit hash was used (modulo hash):
- sensor node address % 256

The ninth simulation yields the following results:
- All sensor node: Mean: 1272.396020 (0.4%), Std. dev.: 97.251658, Min: 1052, Max: 1607
- Company 0: Mean: 1278.983600 (0.4%), Std. dev.: 97.910426, Min: 1052, Max: 1607
- Company 1: Mean: 1269.186960 (0.4%), Std. dev.: 96.637009, Min: 1052, Max: 1607

Figure 18:
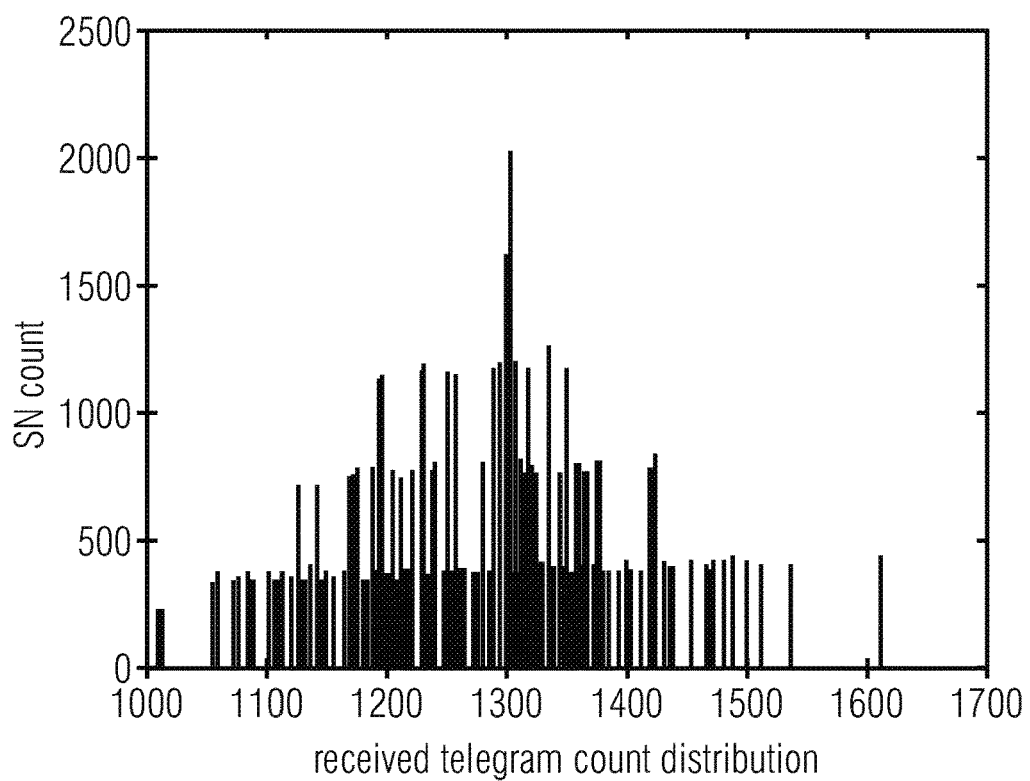
FIG. 18 shows in a diagram a distribution of the received telegram count with different companies and modulo hashing.

For the ninth simulation, FIG. 18 shows in a diagram a distribution of the received telegram count with different companies and modulo hashing. In FIG. 18, the ordinate denotes the number of sensor nodes (sensor node count), wherein the abscissa denotes the received telegram count distribution.

For a tenth simulation, the following 8 bit hash was used (company separated hash bins):
- sensor node address % 64+2 LSB from company ID part of sensor node address The tenth simulation yields the following results:
- All sensor node: Mean: 1272.626500 (0.4%), Std. dev.: 1528.990707, Min: 325, Max: 4390
- Company 0: Mean: 3915.579200 (1.2%), Std. dev.: 190.929810, Min: 3450, Max: 4390

Company 1: Mean: 391.788400 (0.1%), Std. dev.: 21.277843, Min: 336, Max: 447

For the tenths simulation it can be noted that:

Company 1 not influenced by high activity of company 0

Figure 19:
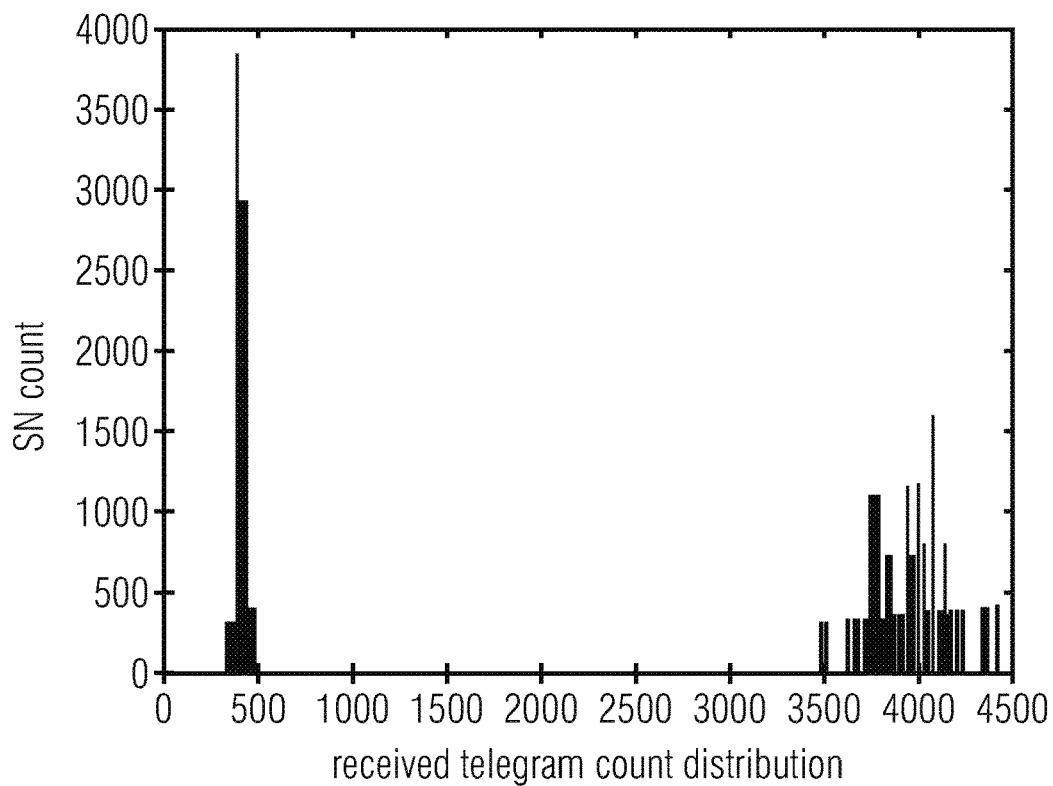
FIG. 19 shows in a diagram a distribution of the received telegram count with different companies and separated hash bins.

Company 0 cannot spread to all hash bins and thus has much higher receive counts For the tenth simulation, FIG. 19 shows in a diagram a distribution of the received telegram count with different companies and separated hash bins. In FIG. 19, the ordinate denotes the number of sensor nodes (sensor node count), wherein the abscissa denotes the received telegram count distribution.

For an eleventh simulation, an 8 bit hash explicitly assigned via adaptive hashing algorithm was used. Company sensor node assigned is interleaved. Further, a cross company factor of 1 was used. This means influence on other companies is not penalized against influence on sensor node of the same company.

The eleventh simulation yields the following results:

All sensor node: Mean: 949.34 (0.3%), Std. dev.: 741.83, Min: 520, Max: 2240

Company 0: Mean: 2232.6 (0.7%), Std. dev.: 3.9095, Min: 2230, Max: 2240

Company 1: Mean: 521.60 (0.16%), Std. dev.: 43.262, Min: 520, Max: 2231

Company 2: Mean: 521.60 (0.16%), Std. dev.: 43.262, Min: 520, Max: 2231

Company 3: Mean: 521.60 (0.16%), Std. dev.: 43.262, Min: 520, Max: 2231

For the eleventh simulation it can be noted that:

Some sensor nodes of other companies are assigned to bins with high activity sensor nodes of company 0

Figure 20:
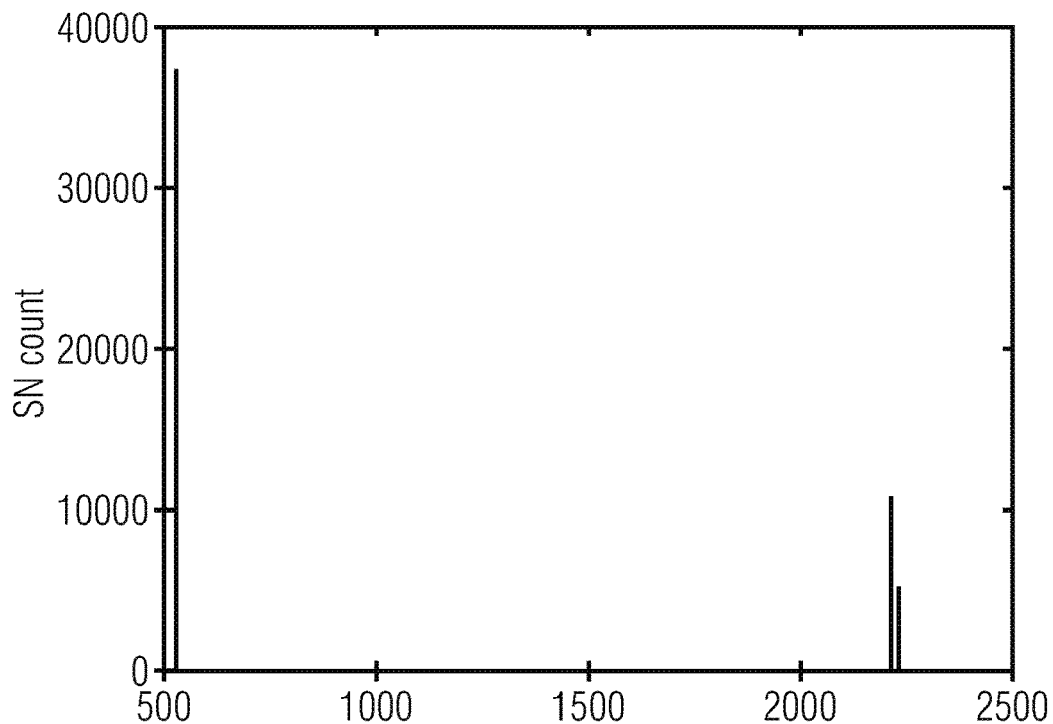
FIG. 20 shows in a diagram a distribution of the received telegram count with different companies and adaptive hashing without cross-influence penalization.

Optimization of total system efficiency without company or single sensor node considerations For the eleventh simulation, FIG. 20 shows in a diagram a distribution of the received telegram count with different companies and adaptive hashing without cross-influence penalization. In FIG. 20, the ordinate denotes the number of sensor nodes (sensor node count), wherein the abscissa denotes the received telegram count distribution.

For a twelfth simulation, an 8 bit hash explicitly assigned via adaptive hashing algorithm was used. Company sensor node assignment is interleaved. Further, a cross company factor of 2 was used. This means influence on other companies is double weighted against influence on sensor node of the same company.

The twelfths simulation yields the following results:

All sensor nodes: Mean: 1269.5 (0.4%), Std. dev.: 1522.3, Min: 390, Max: 3910

Company 0: Mean: 3906.3 (1.2%), Std. dev.: 4.8398, Min: 3900, Max: 3910

Company 1: Mean: 390.63 (0.1%), Std. dev.: 0.4840, Min: 390, Max: 391

Company 2: Mean: 390.63 (0.1%), Std. dev.: 0.4840, Min: 390, Max: 391

Company 3: Mean: 390.63 (0.1%), Std. dev.: 0.4840, Min: 390, Max: 391

For the twelfths simulation it can be noted that:

Companies 1-3 are isolated from company 0 activity

Total system efficiency and company 0 receive counts therefore are worse

Result mimics company separated bins but with much less variance

Figure 21:
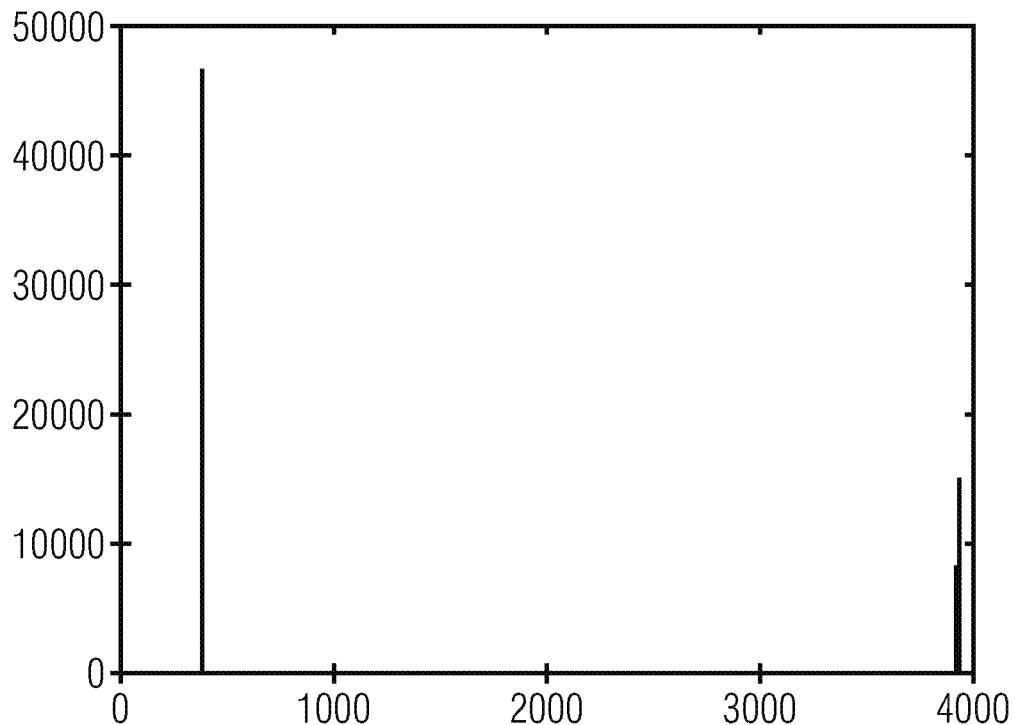
FIG. 21 shows in a diagram a distribution of the received telegram count with different companies and adaptive hashing with cross-influence penalization.

For the twelfth simulation, FIG. 21 shows in a diagram a distribution of the received telegram count with different companies and adaptive hashing with cross-influence penalization. In FIG. 21, the ordinate denotes the number of sensor nodes (sensor node count), wherein the abscissa denotes the received telegram count distribution.

Further Embodiments

Figure 22:
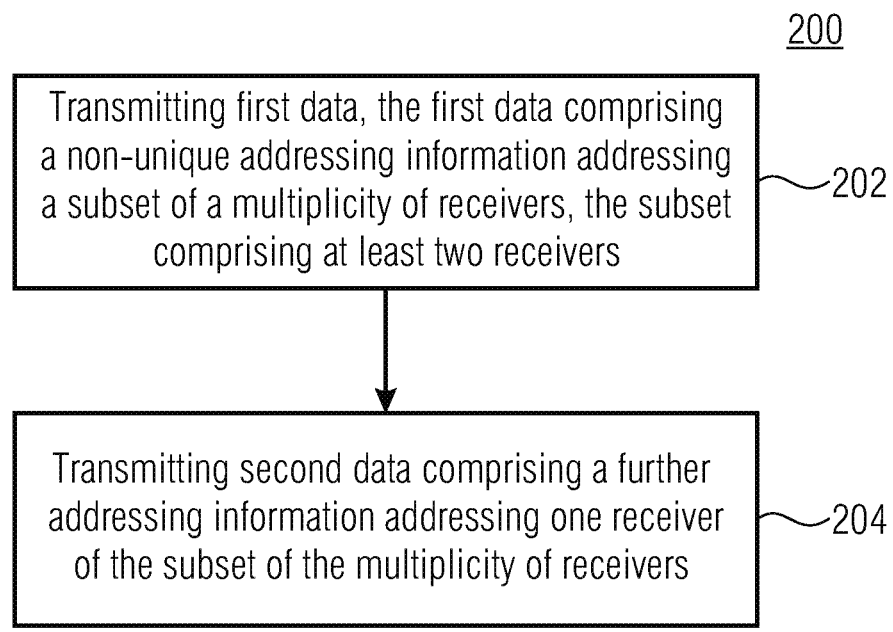
FIG. 22 shows a flowchart of a method 200 for transmitting data, according to an embodiment.

FIG. 22 shows a flowchart of a method 200 for transmitting data. The method 200 comprises a step 202 of transmitting first data, the first data comprising a non-unique addressing information addressing a subset of a multiplicity of receivers, the subset comprising at least two receivers. Further, the method 200 comprises a step 204 of transmitting second data comprising a further addressing information addressing one receiver of the subset of the multiplicity of receivers.

Figure 23:
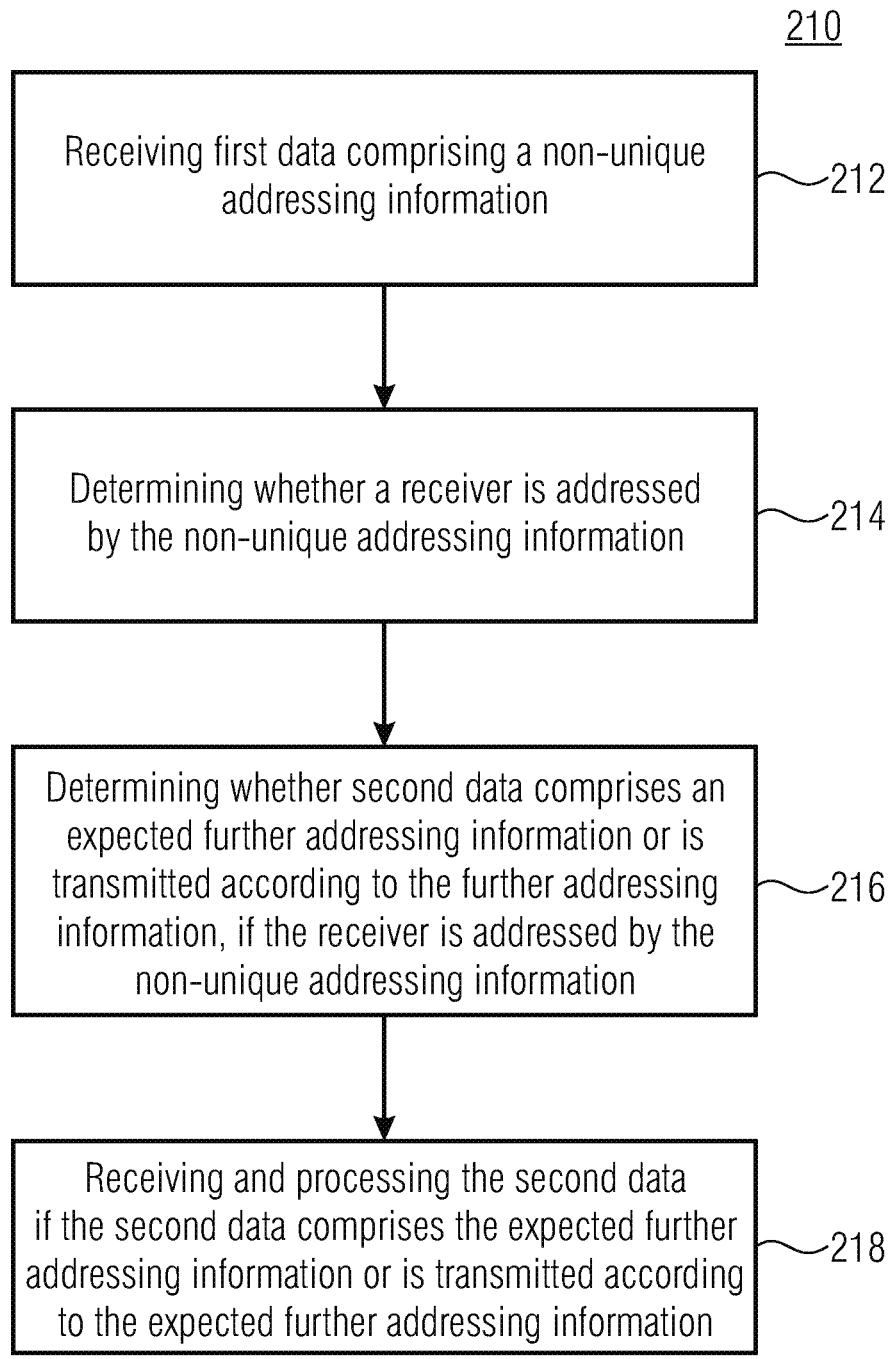
FIG. 23 shows a flowchart of a method for receiving data, according to an embodiment.

FIG. 23 shows a flowchart of a method 210 for receiving data. The method 210 comprises a step 212 of receiving first data comprising a non-unique addressing information. Further, the method 210 comprises a step 214 of determining whether a receiver is addressed by the non-unique addressing information. Further, the method 210 comprises a step 216 of determining whether second data comprises an expected further addressing information or is transmitted according to the further addressing information, if the receiver is addressed by the non-unique addressing information. Further, the method 210 comprises a step 218 of receiving and processing the second data if the second data comprises the expected further addressing information or is transmitted according to the expected further addressing information.

FIG. 24 shows a flowchart of a method 220 for forming a subset of receivers which share the same non-unique addressing information. The method 220 comprises a step 222 of associating each receiver of a multiplicity of receivers with one or multiple parameters quantifying how the presence of said receiver affects other receivers in the same subset (e.g., an expected number of transmissions transmitted to the receiver). Further, the method 220 comprises a step 224 of associating each receiver of the multiplicity of receivers with one or multiple parameters weighting the severity of the effects caused by other receivers in the same subset (e.g., a tolerated power consumption). Further, the method 220 comprises a step 226 of optimizing the overall weighted effects towards a minimum total of weighted effects or optimizing towards a minimum of the variance of the weighted effects between different subsets, or a combination thereof via the penalization of deviations in the variance towards the total weighted effects.

Embodiments can be used for LPWAN with one base station and many (up to more than 100 000) sensor nodes.

In embodiments, sensor nodes are addressed infrequently, e.g. once a day, some might be addressed far more often.

In embodiments, base station transmits beacons (=broadcast telegram) with defined time interval.

In embodiments, sensor nodes may listen for beacons, not necessarily for every beacon.

In embodiments, beacon can be as short as possible to minimize reception time that may be involved in sensor nodes.

In embodiments, beacon can be used to address sensor nodes for downlink data transmission.

In embodiments, addressed sensor nodes listen at a specific time slot in between beacons for the transmission.

In embodiments, one beacon could be able to initiate multicast as well as multiple unicasts transmissions.

In embodiments, groups for multicast could be dynamically assigned after system setup.

In embodiments, hashes of node addresses can be used to preselect bins of nodes.

In embodiments, addressing can be performed in multiple dimensions, address and time slot are two dimensions, time domain can be selected implicitly, frequency as third dimension (optional).

In embodiments, a transmission slot can be determined from node address, orthogonally to hash bin if nodes preselected should receive individual unicasts (nodes with same hash use different time slot), parallel to hash bin for multicast (nodes with same hash use same time slot).

In embodiments, the address space (i.e. 32 bit per company) can be much larger than address space used at one base station. Thus, in embodiments, only used addresses need to be considered (i.e. omit "subnet" for preselection as nodes on other "subnets" won't receive this base station anyway and futile targeting has no consequences).

In embodiments, a beacon counter can be used to shuffle hash bins for each beacon, so nodes with high wakeup count don't cause the same other nodes to futilely wake up every time (better spreading of power consumption for collateral wakeups).

In embodiments, an extension or extensions can be attached to a beacon with separate error correction/detection (Reed Solomon, CRC, etc.). Thereby, core beacon can be used for first preselection, extension(s) to further narrow down, wherein nodes excluded in one stage can stop receiving immediately.

In embodiments, asymmetric hash bins can be used to group nodes based on their transmission frequency, power constraints, etc. (i.e. group ac powered nodes to larger bins as futile wakeups are no issue).

In embodiments, if multicast groups are addressed via the same hashing, those groups can be placed in "low wakeup frequency" bins as a futile group wakeup means wasted power for all group members.

In embodiments, nodes might not listen for every beacon depending on individual requirements, base station has to know which nodes are listening for which beacon, nodes listening for different beacons can be in the same hash bin without causing futile wakeups.

In embodiments, switchable modes can be used, such as fixed listening slots, full addressing and/or hash based preselection.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein.

In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A transmitter for communicating with a multiplicity of receivers,
    wherein the transmitter is configured to communicate with the multiplicity of receivers using a three-stage addressing scheme, wherein the transmitter comprises:
    a transmitter module, wherein, in a first stage of the three-stage addressing scheme, the transmitter is configured to transmit, using the transmitter module, a beacon, the beacon comprising a non-unique addressing information addressing a subset of the multiplicity of receivers, the subset comprising at least two receivers, wherein, in a second stage of the three-stage addressing scheme, the transmitter is configured to transmit, using the transmitter module, a data packet to the subset of the multiplicity of receivers addressed in the first stage, wherein the data packet comprises a further addressing information, the further addressing information non-uniquely addressing one receiver out of the subset of the multiplicity of receivers addressed in the first stage by the non-unique addressing information, and wherein, in a third stage of the three-stage addressing scheme, the transmitter is configured to transmit third data comprising a unique addressing information uniquely addressing the one receiver of the multiplicity of receivers;
    wherein a number of receivers of the subset of receivers is smaller than a number of receivers of the multiplicity of receivers.

2. The transmitter according to claim 1, wherein the non-unique addressing information and the further addressing information together uniquely address the one receiver out of the multiplicity of receivers.

3. The transmitter according to claim 1, wherein the data packet comprises the further addressing information,
    wherein the data packet comprises the further addressing information in a data field of the data packet.

4. The transmitter according to claim 1, wherein the transmitter is configured to assign at least one out of the non-unique addressing information and the further addressing information to the one receiver.

5. The transmitter according to claim 4, wherein the transmitter is configured to assign the non-unique addressing information to the one receiver in dependence on operation parameters of the other receivers of the subset of the multiplicity of receivers, which are also addressed by the non-unique addressing information.

6. The transmitter according to claim 4, wherein the transmitter is configured to select the subset of receivers out of the multiplicity of receivers in dependence on operating parameters of the multiplicity of receivers, and to assign the non-unique addressing information to the selected subset of receivers.

7. The transmitter according to claim 6, wherein the operating parameters are at least one out of physical limitations of the receivers, different owners of the receivers, and an expected number of transmissions to the receivers.

8. The transmitter according to claim 1, wherein the transmitter is configured to separate the data packet into a plurality of sub-data packets, each of the sub-data packets being shorter than the data packet, wherein the transmitter is configured to transmit the plurality of sub-data packets using at least one out of a frequency hop pattern and time hop pattern.

9. A receiver for communicating with a transmitter,
    wherein the receiver is configured to communicate with the transmitter using a three-stage addressing scheme, wherein the receiver comprises:
    a receiver module, wherein the receiver is configured to receive in a first stage of the three-stage addressing scheme, using the receiver module, a beacon comprising a non-unique addressing information, wherein the receiver is configured to determine whether the receiver is addressed by the non-unique addressing information, wherein, if the receiver is addressed by the non-unique addressing information, the receiver is configured to determine in a second stage of the three-stage addressing scheme whether a data packet comprises an expected further addressing information non-uniquely addressing the receiver, wherein, if the data packet comprises the expected further addressing information, the receiver is configured to receive, using the receiver module, and process the data packet, wherein the receiver is configured to determine, in a third stage of the three-stage addressing scheme, whether third data comprises a unique addressing information uniquely addressing the receiver, and wherein the receiver is configured to receive, using the receiver module, the third data if the unique addressing information uniquely addresses the receiver.

10. The receiver according to claim 9, wherein the receiver comprises a unique address for communicating with the transmitter.

11. The receiver according to claim 10, wherein a non-unique address is shorter than the unique address.

12. The receiver according to claim 10, wherein the receiver is configured to derive the non-unique address from the unique address.

13. The receiver according to claim 12, wherein the receiver is configured to hash the unique address in order to acquire the non-unique address.

14. The receiver according to claim 10, wherein the receiver is configured to receive the non-unique address from the transmitter or a central unit.

15. The receiver according to claim 9, wherein the data packet comprises the expected further addressing information,
    wherein the data packet comprises the expected further addressing information in a data field of the data packet.

16. The receiver according to claim 9, wherein the receiver is configured to wake-up at a known transmission time of the beacon for receiving the beacon.

17. The receiver according to claim 9, wherein the receiver is configured to wake-up at a known transmission time of the data packet for receiving the data packet, if the receiver is comprised by a subset selected by the non-unique addressing information in the beacon.

18. The receiver according to claim 9, wherein the receiver is configured to wake-up according to the expected further addressing information for receiving the data packet.

19. The receiver according to claim 9, wherein the receiver is configured to stop receiving the data packet if the data packet does not comprise the further addressing information or is not received according to the further addressing information.

20. The receiver according to claim 9, wherein the data packet that is transmitted separated into a plurality of sub-data packets, each of the sub-data packets being shorter than the data packet, wherein the plurality of sub-data packets are transmitted using at least one out of a frequency hop pattern and time hop pattern;
  wherein the receiver is configured to receive the plurality of sub-data packets and to combine the plurality of sub-data packets, to acquire the data packet.

21. A system, comprising:
  a transmitter, configured to communicate with a multiplicity of receivers using a three-stage addressing scheme, wherein the transmitter comprises a transmitter module, wherein, in a first stage of the three-stage addressing scheme, the transmitter is configured to transmit, using the transmitter module, a beacon, the beacon comprising a non-unique addressing information addressing a subset of the multiplicity of receivers, the subset comprising at least two receivers, wherein, in a second stage of the three-stage addressing scheme, the transmitter is configured to transmit, using the transmitter module, a data packet to the subset of the multiplicity of receivers addressed in the first stage, wherein the data packet comprises a further addressing information, the further addressing information non-uniquely addressing one receiver or one group of receivers of the subset of the multiplicity of receivers addressed in the first stage by the non-unique addressing information, wherein, in a third stage of the three-stage addressing scheme, the transmitter is configured to transmit third data comprising a unique addressing information uniquely addressing the one receiver of the multiplicity of receivers;
  wherein a number of receivers of the subset of receivers is smaller than a number of receivers of the multiplicity of receivers; and
  a receiver out of the multiplicity of receivers configured to communicate with the transmitter using the three-stage addressing scheme, wherein the receiver comprises a receiver module, wherein the receiver is configured to receive in the first stage of the three-stage addressing scheme, using the receiver module, the beacon comprising the non-unique addressing information and to determine whether the receiver is addressed by the non-unique addressing information, wherein, if the receiver is addressed by the non-unique addressing information, the receiver is configured to determine whether the data packet comprises the expected further addressing information non-uniquely addressing the receiver, wherein, if the data packet comprises the expected further addressing information, the receiver is configured to receive, using the receiver module the data packet, and process the data packet, wherein the receiver is configured to determine, in a third stage of the three-stage addressing scheme, whether third data comprises a unique addressing information uniquely addressing the receiver, and wherein the receiver is configured to receive, using the receiver module, the third data if the unique addressing information uniquely addresses the receiver.

22. A method for transmitting data with a data transmitter, wherein the method comprises:
  transmitting, as a first stage of a three-stage addressing scheme, with the data transmitter a beacon, the beacon comprising a non-unique addressing information addressing a subset of a multiplicity of receivers, the subset comprising at least two receivers;
  transmitting, as a second stage of the three-stage addressing scheme, with the data transmitter a data packet to the subset of the multiplicity of receivers addressed in the first stage, wherein the data packet comprises a further addressing information, the further addressing information non-uniquely addressing one receiver of the subset of the multiplicity of receivers addressed in the first stage; and
  transmitting, as a third stage of the three-stage addressing scheme, with the data transmitter, third data comprising a unique addressing information uniquely addressing the one receiver of the multiplicity of receivers;
  wherein a number of receivers of the subset of receivers is smaller than a number of receivers of the multiplicity of receivers.

23. A method for receiving data with a data receiver, the method comprising:
  receiving, as a first stage of a three-stage addressing scheme, with the data receiver a beacon comprising a non-unique addressing information;
  determining with the data receiver whether the receiver is addressed by the non-unique addressing information;
  determining, if the receiver is addressed by the non-unique addressing information, as a second stage of the three-stage addressing scheme, with the data receiver whether a data packet comprises an expected further addressing information non-uniquely addressing the receiver;
  receiving and processing, with the data receiver, the data packet if the data packet comprises the expected further addressing information;
  determining, as a third stage of the three stage addressing scheme, whether third data comprises a unique addressing information uniquely addressing the receiver, and
  receiving and processing the third data if the unique addressing information uniquely addresses the receiver.

24. A non-transitory digital storage medium having a computer program stored thereon, wherein the computer program, when executed by a computer, cause the computer to perform a method for transmitting data with a data transmitter, wherein the method comprises:
  transmitting, as a first stage of a three-stage addressing scheme, with the data transmitter a beacon, the beacon comprising a non-unique addressing information addressing a subset of a multiplicity of receivers, the subset comprising at least two receivers;
  transmitting, as a second stage of the three-stage addressing scheme, with the data transmitter a data packet to the subset of the multiplicity of receivers addressed in the first stage, wherein the data packet comprises a further addressing information, the further addressing information non-uniquely addressing one receiver of the subset of the multiplicity of receivers addressed in the first stage; and
  transmitting, as a third stage of the three-stage addressing scheme, with the data transmitter, third data comprising a unique addressing information uniquely addressing the one receiver of the multiplicity of receivers;
  wherein a number of receivers of the subset of receivers is smaller than a number of receivers of the multiplicity of receivers.

25. A transmitter for communicating with a multiplicity of receivers,
wherein the transmitter is configured to communicate with the multiplicity of receivers, wherein the transmitter comprises:
a transmitter module, wherein the transmitter, in a first stage of a three-stage addressing scheme is configured to transmit, using the transmitter module, first data, the first data comprising a non-unique addressing information addressing a subset of the multiplicity of receivers, the subset comprising at least two receivers, wherein the transmitter, in a second stage of the three-stage addressing scheme, is configured to transmit, using the transmitter module, second data comprising a further addressing information or transmitted according to the further addressing information, the further addressing information non-uniquely addressing one receiver or one group of receivers of the subset of the multiplicity of receivers, wherein the transmitter, in a third stage of the three-stage addressing scheme, is configured to transmit third data comprising a unique addressing information uniquely addressing the one receiver of the multiplicity of receivers;
wherein the transmission of the first data and the transmission of the second data are separate or independent transmissions;
wherein a number of receivers of the subset of receivers is smaller than a number of receivers of the multiplicity of receivers;
wherein the first data and the second data are transmitted in different time slots.

26. A method for transmitting data with a data transmitter, wherein the method comprises:
transmitting, in a first stage of a three-stage addressing scheme, with the data transmitter, first data, the first data comprising a non-unique addressing information addressing a subset of a multiplicity of receivers, the subset comprising at least two receivers; and
transmitting, in a second stage of the three-stage addressing scheme, with the data transmitter, second data comprising a further addressing information or transmitted according to the further addressing information, the further addressing information non-uniquely addressing one receiver of the subset of the multiplicity of receivers;
transmitting, in a third stage of the three-stage addressing scheme, with the data transmitter, third data comprising a unique addressing information uniquely addressing the one receiver of the multiplicity of receivers;
wherein the transmission of the first data and the transmission of the second data are separate or independent data transmissions;
wherein a number of receivers of the subset of receivers is smaller than a number of receivers of the multiplicity of receivers;
wherein the first data and the second data are transmitted in different time slots.

27. A receiver for communicating with a transmitter,
wherein the receiver is configured to communicate with the transmitter using a three-stage addressing scheme, wherein the receiver comprises:
a receiver module, wherein the receiver is configured to receive in a first stage of the three-stage addressing scheme, using the receiver module, first data comprising a non-unique addressing information and to determine whether the receiver is addressed by the non-unique addressing information, wherein, if the receiver is addressed by the non-unique addressing information, the receiver is configured to determine in a second stage of the three-stage addressing scheme whether second data comprises an expected further addressing information non-uniquely addressing the receiver, wherein, if the second data comprises the expected further addressing information, the receiver is configured to receive, using the receiver module, the second data and process the second data, wherein the receiver is configured to determine, in a third stage of the three-stage addressing scheme, whether third data comprises a unique addressing information uniquely addressing the receiver, wherein the receiver is configured to receive, using the receiver module, the third data if the unique addressing information uniquely addresses the receiver, and wherein the reception of the first data and the reception of the second data are separate or independent receptions.

28. A method for receiving data with a data receiver, the method comprising:
receiving, as a first stage of a three-stage addressing scheme, with the data receiver first data comprising a non-unique addressing information;
determining with the data receiver whether the receiver is addressed by the non-unique addressing information;
determining, with the data receiver, whether second data comprises an expected further addressing information non-uniquely addressing the receiver if the receiver is addressed by the non-unique addressing information, as a second stage of the three-stage addressing scheme;
receiving and processing, with the data receiver, the second data if the data packet comprises the expected further addressing information;
determining, as a third stage of the three stage addressing scheme, whether third data comprises a unique addressing information uniquely addressing the receiver; and
receiving and processing, with the data receiver, the third data if the unique addressing information uniquely addresses the receiver, and
wherein the reception of the first data and the reception of the second data are separate or independent receptions.

29. A transmitter for communicating with a multiplicity of receivers,
wherein the transmitter is configured to communicate with the multiplicity of receivers using a three-stage addressing scheme, wherein the transmitter comprises:
a transmitter module, wherein, in a first stage of the three-stage addressing scheme, the transmitter is configured to transmit, using the transmitter module, a beacon, the beacon comprising a partial addressing information addressing a subset of the multiplicity of receivers, the subset comprising at least two receivers, wherein, in a second stage of the three-stage addressing scheme, the transmitter is configured to transmit, using the transmitter module, a data packet to the subset of the multiplicity of receivers addressed in the first stage, wherein the data packet comprises a full addressing information, the full addressing information non-uniquely addressing one receiver or one group of receivers of the subset of the multiplicity of receivers, and wherein, in a third stage of the three-stage addressing scheme, the transmitter is configured to transmit third data comprising a unique addressing information uniquely addressing the one receiver of the multiplicity of receivers;

wherein a number of receivers of the subset of receivers is smaller than a number of receivers of the multiplicity of receivers.

30. A receiver for communicating with a transmitter,
wherein the receiver is configured to communicate with the transmitter using a three-stage addressing scheme, wherein the receiver comprises:
a receiver module, wherein the receiver is configured to receive in a first stage of the three-stage addressing scheme a beacon comprising a partial addressing information and to determine whether the receiver is addressed by the partial addressing information, wherein, if the receiver is addressed by the partial addressing information, the receiver is configured to determine whether a data packet comprises an expected full addressing information non-uniquely addressing the receiver, wherein, if the data packet comprises the expected full addressing information, the receiver is configured to receive, using the receiver module, the data packet, and process the data packet, wherein the receiver is configured to determine, in a third stage of the three-stage addressing scheme, whether third data comprises a unique addressing information uniquely addressing the receiver, wherein the receiver is configured to receive, using the receiver module, the third data if the unique addressing information uniquely addresses the receiver.

\* \* \* \* \*